US012753932B2

(12) United States Patent
Marsh-Croft et al.

(10) Patent No.: US 12,753,932 B2
(45) Date of Patent: Oct. 6, 2026

(54) OVEN

(71) Applicant: BREVILLE PTY LIMITED, Alexandria (AU)

(72) Inventors: Byron Ashley Marsh-Croft, Alexandria (AU); Damian Philip Rocca, Alexandria (AU); Dylan Stuart Dasey, Alexandria (AU); Tibor Hegedis, Alexandria (AU); Alfred Gar-Wo Ching, Alexandria (AU); John Chul-Won Lee, Alexandria (AU); Olexandr Mal'Chykov, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 596 days.

(21) Appl. No.: 18/044,255

(22) PCT Filed: Sep. 7, 2021

(86) PCT No.: PCT/AU2021/051032
§ 371 (c)(1),
(2) Date: Mar. 7, 2023

(87) PCT Pub. No.: WO2022/051800
PCT Pub. Date: Mar. 17, 2022

(65) Prior Publication Data

US 2024/0027076 A1 Jan. 25, 2024

(30) Foreign Application Priority Data

Sep. 9, 2020 (AU) ................................ 2020903228

(51) Int. Cl.
*F24C 15/32* (2006.01)
*A21B 1/02* (2006.01)
(Continued)

(52) U.S. Cl.
CPC .............. *F24C 15/325* (2013.01); *A21B 1/02* (2013.01); *A21B 1/24* (2013.01); *A21B 1/26* (2013.01);
(Continued)

(58) Field of Classification Search
CPC .... A21B 1/02; A21B 1/26; A21B 1/24; F24C 7/046; F24C 7/062; F24C 15/325; F24C 7/065
(Continued)

(56) References Cited

U.S. PATENT DOCUMENTS 2,491,420 A 12/1949 Scott
3,324,844 A 6/1967 Huffman
(Continued)

FOREIGN PATENT DOCUMENTS

DE 2339446 A1 2/1975
EP 0409324 A1 1/1991
(Continued)

OTHER PUBLICATIONS

Extended European Search Report for EP Application No. 21865382.2, dated Aug. 7, 2024, 8 pages.

*Primary Examiner* — Helena Kosanovic
*Assistant Examiner* — Benjamin W Johnson
(74) *Attorney, Agent, or Firm* — KDW FIRM PLLC

(57) ABSTRACT

An oven (1000) having a body (1002) that includes a base, a ceiling, and side walls extending between the base and the ceiling, the side walls at least partly surrounding a cooking cavity (1030), the oven (1000) including:
an impeller assembly (1060) mounted to a first side wall of the oven body, the impeller assembly (1060) including:
an impeller (1062) that is rotatable to direct air flow within the cooking cavity (1030);
(Continued)

a plurality of air guides (2006) that at least partially surround the impeller (1062), the air guides (2006) each defining a channel that extends generally transversely from a central axis of the impeller (1062); and a pair of heating elements (2010) located on either side of the impeller (1062), whereby air that is directed from the impeller (1062) travels transversely along the channels of the air guides (2006), across the heating elements (2010), and into the cooking cavity (1030).

8 Claims, 21 Drawing Sheets

(51) Int. Cl.

| | |
|---|---|
| *A21B 1/24* | (2006.01) |
| *A21B 1/26* | (2006.01) |
| *F24C 7/04* | (2021.01) |
| *F24C 7/06* | (2006.01) |

(52) U.S. Cl.
CPC .............. *F24C 7/046* (2013.01); *F24C 7/062* (2013.01); *F24C 7/065* (2013.01)

(58) Field of Classification Search
USPC ........................................................ 126/19 R
See application file for complete search history.

(56) References Cited

U.S. PATENT DOCUMENTS

| | | | | | |
|---|---|---|---|---|---|
| 4,029,463 | A * | 6/1977 | Johansson | A21B 1/26 | 219/400 |
| 4,909,236 | A * | 3/1990 | Del Fabbro | F28D 7/06 | 126/91 A |
| 5,165,889 | A * | 11/1992 | Baggott | F24C 15/322 | 126/91 A |
| 7,087,864 | B2 * | 8/2006 | Oh | F24C 15/325 | 219/400 |
| 2002/0036195 | A1 | 3/2002 | Loveless | | |
| 2003/0172919 | A1 * | 9/2003 | Rabas | F24C 15/322 | 126/21 R |
| 2008/0185373 | A1 | 8/2008 | Elkasevic | | |

FOREIGN PATENT DOCUMENTS

| | | | | |
|---|---|---|---|---|
| EP | 1517096 | A1 | 3/2005 | |
| EP | 2336650 | A2 | 6/2011 | |
| FR | 2891611 | A1 | 4/2007 | |
| GB | 2109920 | A | 6/1983 | |
| GB | 2136110 | B | 10/1986 | |
| KR | 20060120842 | A | 11/2006 | |
| KR | 20090017299 | A | 2/2009 | |
| KR | 20140069662 | A | 6/2014 | |
| WO | 03054452 | A1 | 7/2003 | |
| WO | WO-2007020584 | A1 * | 2/2007 | F24C 15/325 |
| WO | 2009022847 | A1 | 2/2009 | |
| WO | 2013024685 | A1 | 2/2013 | |

* cited by examiner

OVEN

CROSS-REFERENCE TO RELATED APPLICATIONS

This is a National Stage Application, filed under 35 U.S.C. 371, of International Patent Application No. PCT/AU2021/051032, filed on Sep. 7, 2021, and which claims priority to Australian Patent Application No. 2020903228 filed on Sep. 9, 2020, the entirety of which applications are incorporated by reference herein for all purposes.

FIELD

The present invention relates to cooking appliances such as ovens. In particular, the invention relates to convection systems for ovens.

The invention has been developed primarily for use with an oven and will be described hereinafter with reference to this application. However, it will be appreciated that the invention is not limited to this particular field of use.

BACKGROUND

Appliances used to cook food, such as an oven, provide for circulation of heat around a cooking cavity or a cooking chamber within which the food is being cooked. There are typically three forms of heat transfer around the cooking chamber: conduction, convection and radiation. In an oven, food typically cooks with either convection or radiant heat. Radiant energy from heater elements cooks food with direct heat, whilst convection energy cooks food with non-direct heat applied to the food via air circulation from a fan.

Fans in ovens can be used in either a fan-forced or convection mode. A fan-forced mode utilises the radiant heat from elements inside the cooking cavity, whereby the fan circulates heated air around the cooking cavity to cook the food. Food that is cooked with this fan-forced mode is subject to direct energy from the elements inside the cavity, resulting in centralised browning on a planar surface. On the other hand, oven convection modes typically utilise a heating element that is located outside of the cooking cavity and adjacent to the fan. Hot air is blown throughout the cavity, cooking food evenly with no effect of radiant heat.

SUMMARY

It is an object of the present invention to substantially overcome, or at least ameliorate, one or more of the disadvantages of existing arrangements, or at least provide a useful alternative to existing arrangements.

There is disclosed herein an oven having a body that includes a base, a ceiling, and side walls extending between the base and the ceiling, the side walls at least partly surrounding a cooking cavity, the oven including:

- an impeller assembly mounted to a first side wall of the oven body, the impeller assembly including:
  - an impeller that is rotatable to direct air flow within the cooking cavity;
  - a plurality of air guides that at least partially surround the impeller, the air guides each defining a channel that extends generally transversely from a central axis of the impeller; and
  - a pair of heating elements located on either side of the impeller, whereby air that is directed from the impeller travels transversely along the channels of the air guides, across the heating elements, and into the cooking cavity.

The air guides may each include an upper vane and a lower vane, the upper and lower vanes being connected by a backing portion to define the channel therebetween.

The air guides may be mounted to an inlet manifold of the impeller assembly.

The channel of each air guide may extend transversely towards either a right side wall or a left side wall of the oven, whereby opposing channels create linearly opposing flow paths, and whereby air that travels along the opposing channels subsequently travels towards a front portion of the oven, and then towards a rear wall of the oven.

The air movement may create two air cells within the cooking cavity, the two air cells having opposing flow paths.

The air guides may be positioned between the impeller and the heating elements, whereby the heating elements are spaced from the central axis of the impeller, and thereby a motor of the impeller assembly, by a distance.

The heating elements may each have a generally U-shaped structure defined by two spaced apart parallel and elongated portions or legs connected at their upper ends by a curved portion.

The heating elements may each include at least one mounting portion located towards an upper part of the U-shaped structure adjacent the curved portion.

Preferably, during use, thermal electromagnetic radiation emitted from each of the heating elements is reflected into the cavity to provide a visual indication of an operating state of the oven.

BRIEF DESCRIPTION OF THE DRAWINGS

Preferred embodiments of the present invention will be described by way of example only, with reference to the accompanying drawings, in which.

DETAILED DESCRIPTION

Figure 1:
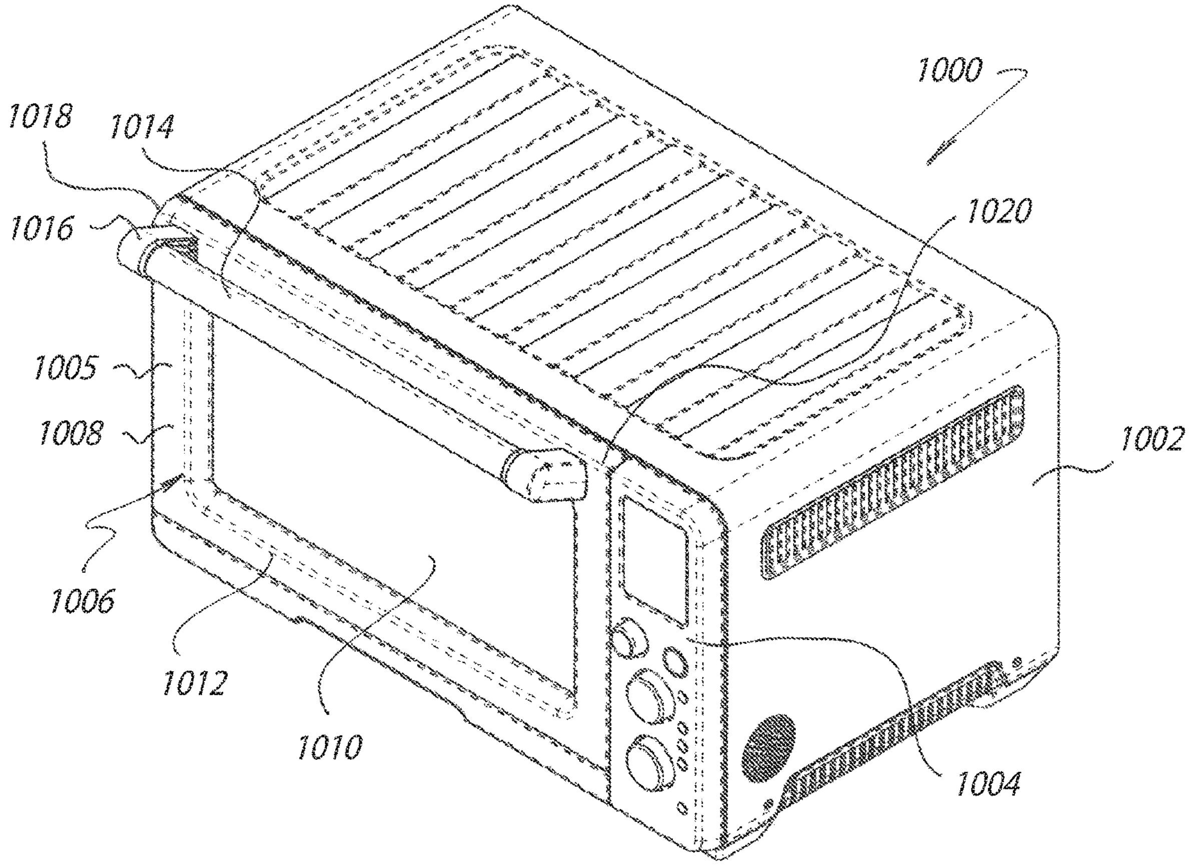
FIG. 1 is a schematic isometric view of a first embodiment of an oven.

In FIG. 1 of the accompanying drawings, there is schematically depicted an oven 1000 having an oven body 1002. The oven 1000 may be in the form of a countertop convection oven, for example. The body 1002 has a user interface portion 1004. The front surface of the oven 1000 is primarily defined by the front surface of the vertically orientated user interface portion 1004 and a horizontally hinged door 1006 to the left of the user interface portion 1005. The exterior surface of the door 1006 includes a bold pillowed frame or surround 1008 and a glass viewing window or pane 1010.

It will be appreciated that in a preferred form, when viewing the door 1006 from the front (i.e. facing the exterior surface of the door 1006), an outer edge 1012 of the viewing pane 1010 is concealed by the frame 1008. The door 1006 includes a handle 1014 at an upper portion thereof. In the depicted embodiment, the handle 1014 is oriented horizontally and supported at each end by a handle mounting bracket 1016. Accordingly, it will be appreciated that a front surface 1005 of the door 1006 may be free from any visible fastener.

The door 1006 in the depicted embodiment has both a generally rounded corner 1018 and a generally square corner 1020. It will be understood that in other embodiments (not shown), the door 1006 may include both rounded or square corners 1018, 1020 in any of the four corners of the door 1006.

Figure 2:
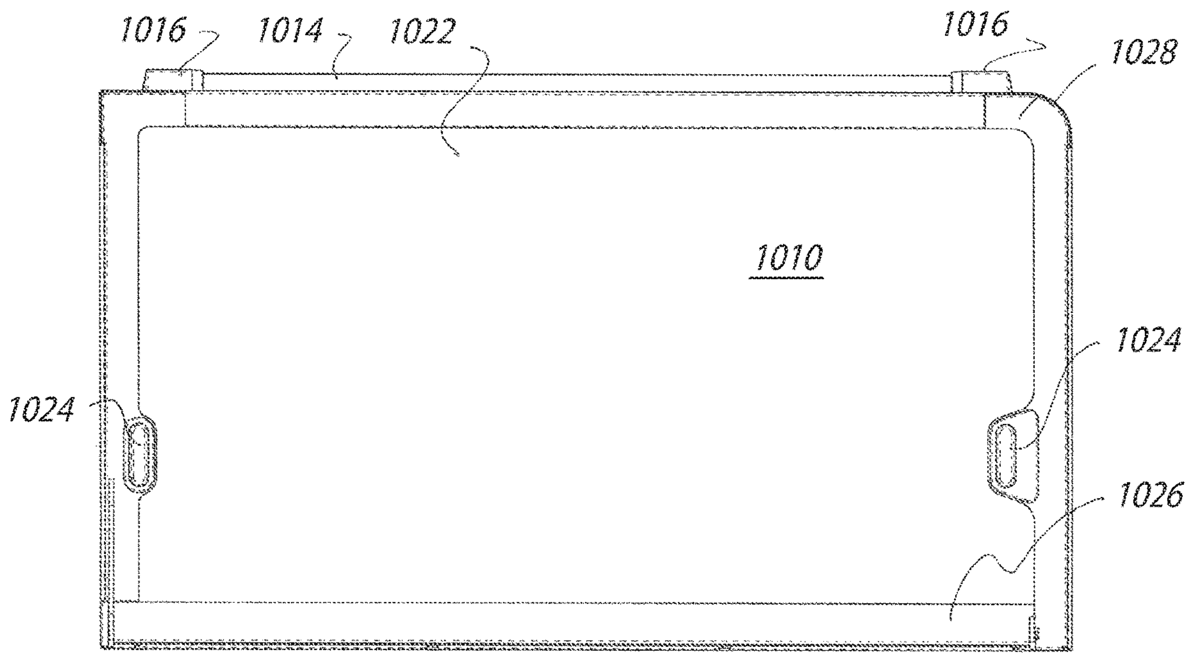
FIG. 2 is a schematic rear view of a door of the oven shown in FIG. 1.

Referring to FIG. 2, a rear surface 1022 of the door 1006 is provided primarily by the rear of the viewing pane 1010. The door 1006 includes two magnetic protrusions 1024 and a lower bracket 1026. In the depicted embodiment, the rear surface 1022 of the door 1006 is primarily glass, and a peripheral margin or border may be formed of various metallic portions 1028, with no fasteners visible on the rear surface 1022 of the door 1006. Further details of the structure of the door 1006 is described in detail in the Applicant's earlier International Application No. PCT/AU2016/051101, filed on 16 Nov. 2016. In the interest of brevity, the entire content of this International Application is incorporated herein by cross-reference.

Figure 3:
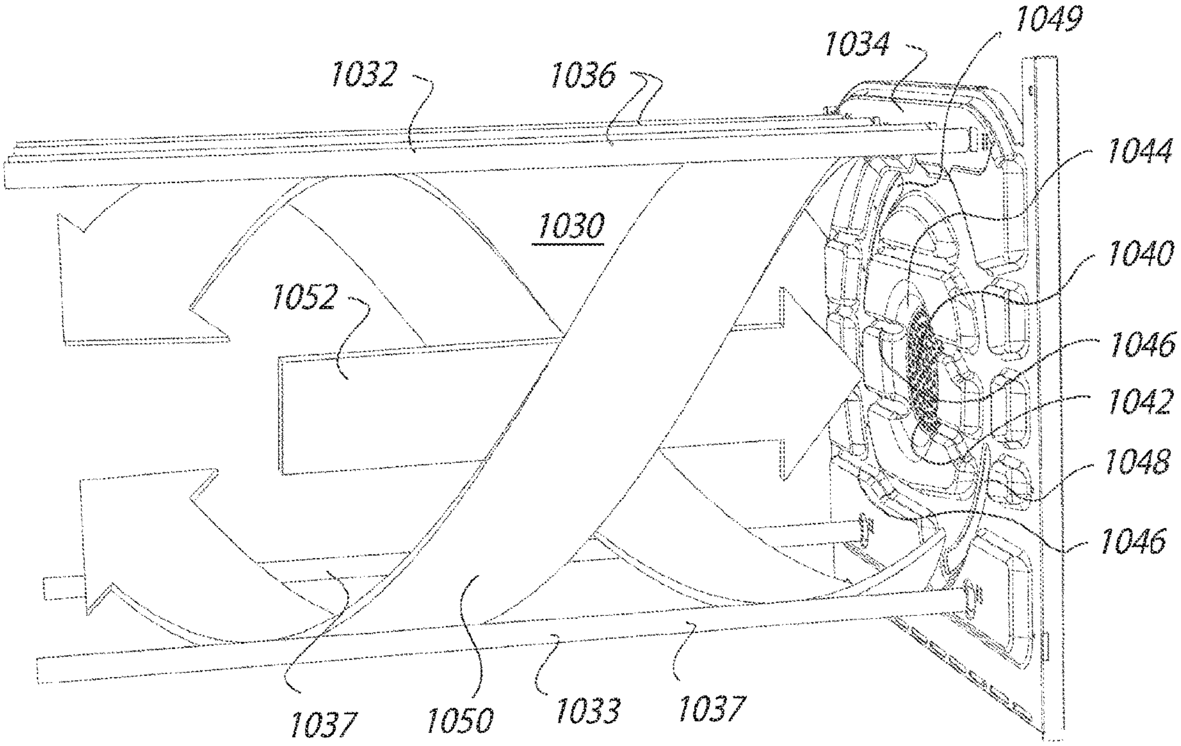
FIG. 3 is a schematic isometric view of a cooking cavity of the oven shown in FIG. 1.

Referring to FIG. 3, an interior or cooking cavity 1030 of the oven 1000 is shown. In the depicted embodiment, the oven 1000 includes an upper heating element assembly 1032 and a lower heating element assembly 1033, each extending transversely between a first (left side) interior side wall (not shown) and a second (right side) interior side wall 1034 surrounding the cooking cavity 1030. In the depicted embodiment, four upper heating elements 1036 and two lower heating elements 1037 are shown.

The second (right side) interior side wall 1034 includes a centrally-located inlet duct 1040, which has a grating portion 1042 and is surrounded by a tapered or funnel-like inlet manifold 1044 on its cavity-facing side. In the depicted embodiment, the features of the second (right side) interior side wall 1034 including the inlet manifold 1044 and transversely-extending indentations 1046 that form guide rails for oven racks, are pressed into a sheet of metal. The second (right side) interior side wall 1034 also includes two arc shaped discharge vents 1048, 1049 that are located in an array formed preferably about a common or near common diameter relative to the centre of an impeller (discussed in further detail below). As will additionally be discussed in further detail below, air is forced through the discharge vents 1048, 1049 in a way that may promote a generally helical air flow pattern 1050. This air flow pattern 1050 is understood to expel air away from the second (right side) interior side wall 1034, towards and around the heating elements assemblies 1032 and 1033. The air flow thereafter is drawn toward an axial flow core 1052. The flow core 1052 moves toward the inlet manifold 1044 and is drawn past the grating portion 1042.

Figure 4:
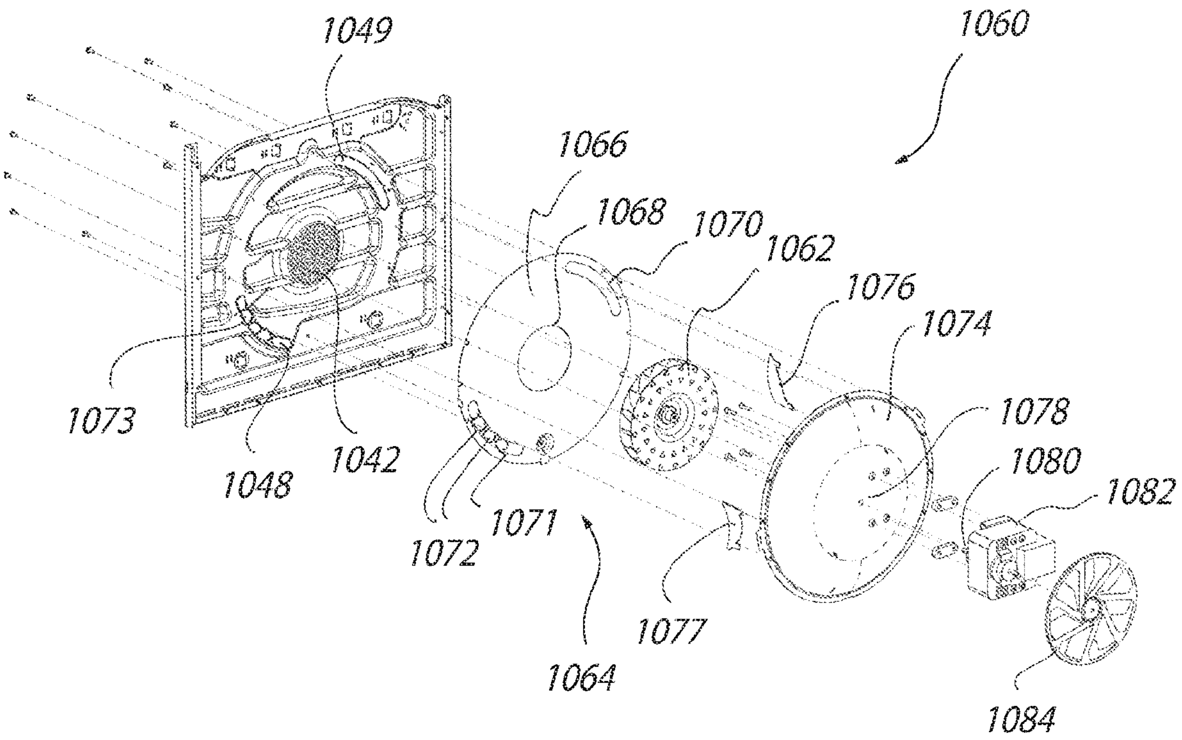
FIG. 4 is a schematic exploded isometric view of an impeller assembly of the oven shown in FIG. 1.

The aforementioned and related airflow patterns are produced in accordance with an exemplary convection impeller assembly 1060 as shown in FIG. 4. The impeller assembly 1060 includes a radial impeller 1062 that is rotatable within an enclosure assembly 1064. The enclosure assembly 1064 may have a flat front surface 1066 which includes an intake opening 1068 and a vent array comprising two sub-arrays, being two exit openings 1070, 1071 that align with the discharge vents 1049, 1048 in the second (right side) interior side wall 1034 described above. The intake and exit openings are described as single openings, but it will be understood that a vent or opening may be subdivided into smaller vents or openings (openings 1072, 1073 for example. The intake opening 1608 aligns with and cooperates with the grating portion 1042.

In the depicted embodiment, a rear surface 1074 of the enclosure assembly 1064 supports internal airflow guide fins 1076, 1077 that direct air toward the exit openings 1070, 1071. The rear surface 1074 may be formed as a dome-shaped structure. A central opening 1078 in the rear surface 1074 accommodates one end of an output shaft 1080 of an electric motor 1082. The other end of the output shaft 1080 drives a motor cooling impeller 1084.

Figure 5:
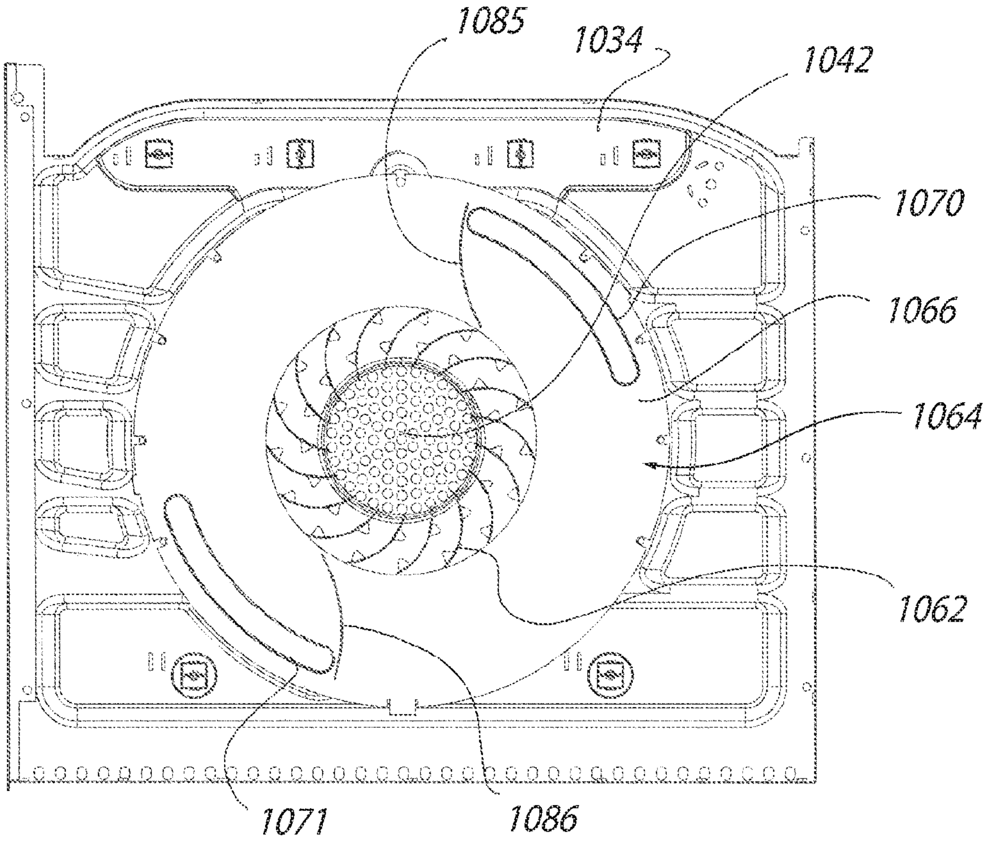
FIG. 5 is a schematic plan view of the impeller assembly of FIG. 4, partially disassembled.

The convection impeller assembly 1060 as depicted in FIG. 4 is also shown in the schematic cross-sectional view of FIG. 5. In FIG. 5, the front surface 1066 of the enclosure assembly 1064 is shown as being installed behind the grating portion 1042. The exit openings 1070, 1071 are in alignment with the discharge vents 1049, 1048 in the second (right side) interior side wall 1034. Air flow is established by the impeller 1062 and is directed by stationary fins 1085, 1086 toward the cooking cavity 1030 via the exit openings 1070, 1071.

Figure 6:
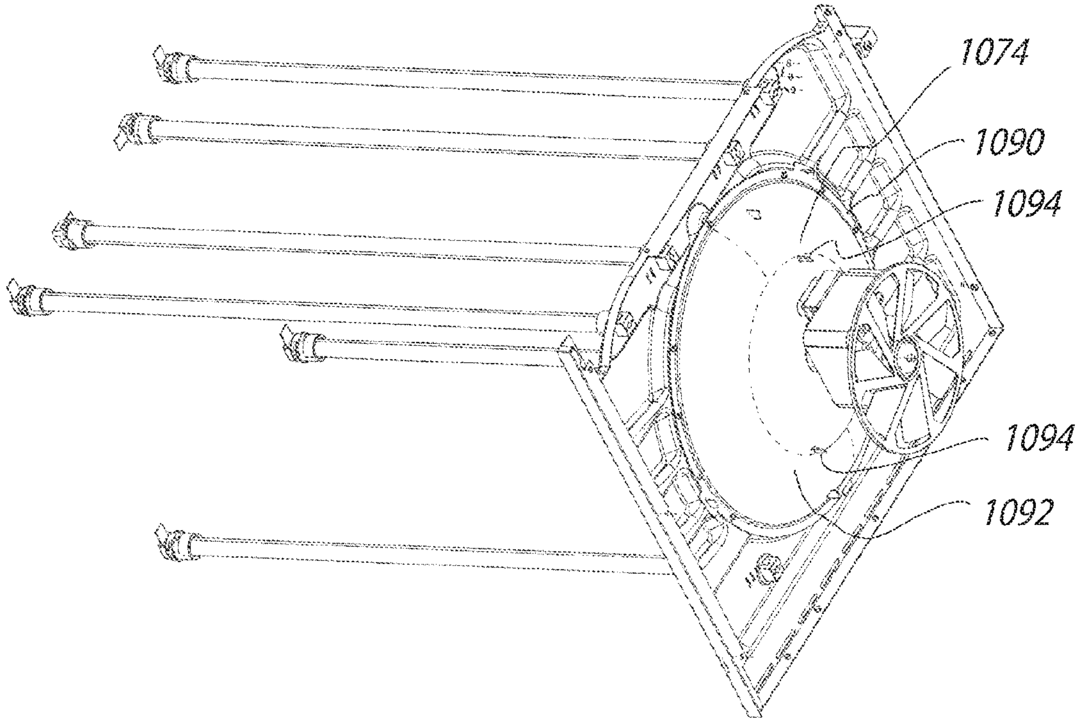
FIG. 6 is a schematic isometric view of an interior wall of the oven shown in FIG. 1, the impeller assembly and heating elements installed.

Referring to FIG. 6, the rear surface 1074 of the enclosure assembly 1064 is shown as having a circular rim 1090 and a dome-like shape 1092. This arrangement may at least provide a convenient surface for openings through which attachment tabs 1094 may be attached.

Figure 7:
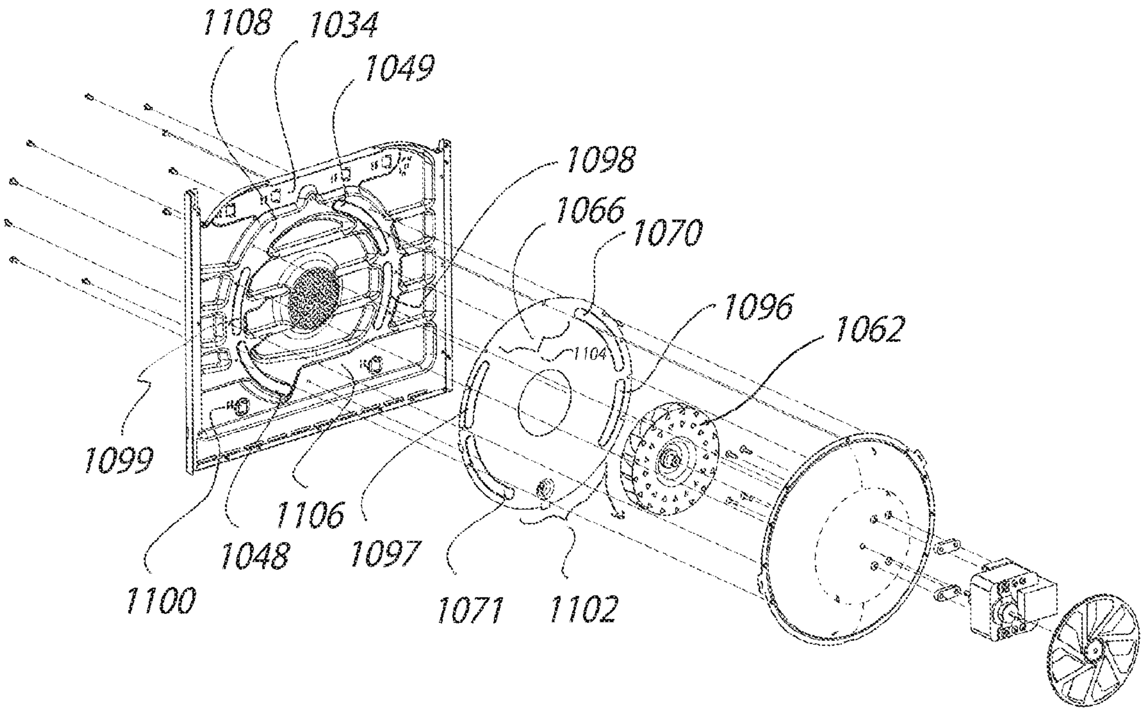
FIG. 7 is a schematic exploded isometric view of another impeller assembly.

In the embodiment as shown in FIG. 7, the exit openings 1070, 1071 may be supplemented by additional exit openings 1096, 1097. The four exit openings 1070, 1071, 1096, 1097 align with the discharge vents 1048, 1049, and additional discharge vents 1098, 10988. Relative to the orientation of the impeller 1062 depicted in FIG. 7, the impeller 1062 can be seen to be rotating anti-clockwise, providing an anti-clockwise airflow through the various openings 1070, 1071, 1096, 1097. The stationary fins 1085, 1086 described above may be provided in this arrangement. Accordingly, the lower-most opening and vent 1071, 1048 terminates adjacent to the closest and outermost of the lower heating elements 1037. The lower heating elements 1037 and lower vent and exit openings 1071, 1097, 1048, 1099 are optional in some ovens. In the depicted embodiment, an element 1100 provides the lower front element. The upper most opening and vent 1070, 1049 terminates adjacent to the closest of the upper heating elements 1036, being the upper rear-most elements. In this way, air discharged from the vents is directed by the helical flow pattern of the discharge toward and past the heating elements. Each of the primary or proximal opening and vent pairs 1071, 1048 and 1070, 1049, may be provided with secondary opening and vent pairs, being 1096, 1098 and 1097, 1099.

In some embodiments, the fins 1085, 1086 are not required when the secondary openings and vents 1096, 1098 and 1097, 1099 are present. In these examples, the aforementioned openings and vents are approximately equal in size and are located around a common diameter with reference to a centre line or axis of the rotatable impeller 1062. The absence of vent openings or exit openings and vents may define two dead zones on each of the front surface 1066 and interior wall 1034. The dead zones are identifiable by an absence of substantial, meaningful perforations or ventilation in areas 1102, 1104 of the front surface 1066 and areas 1106, 1108 of the interior wall 1034.

Figure 8:
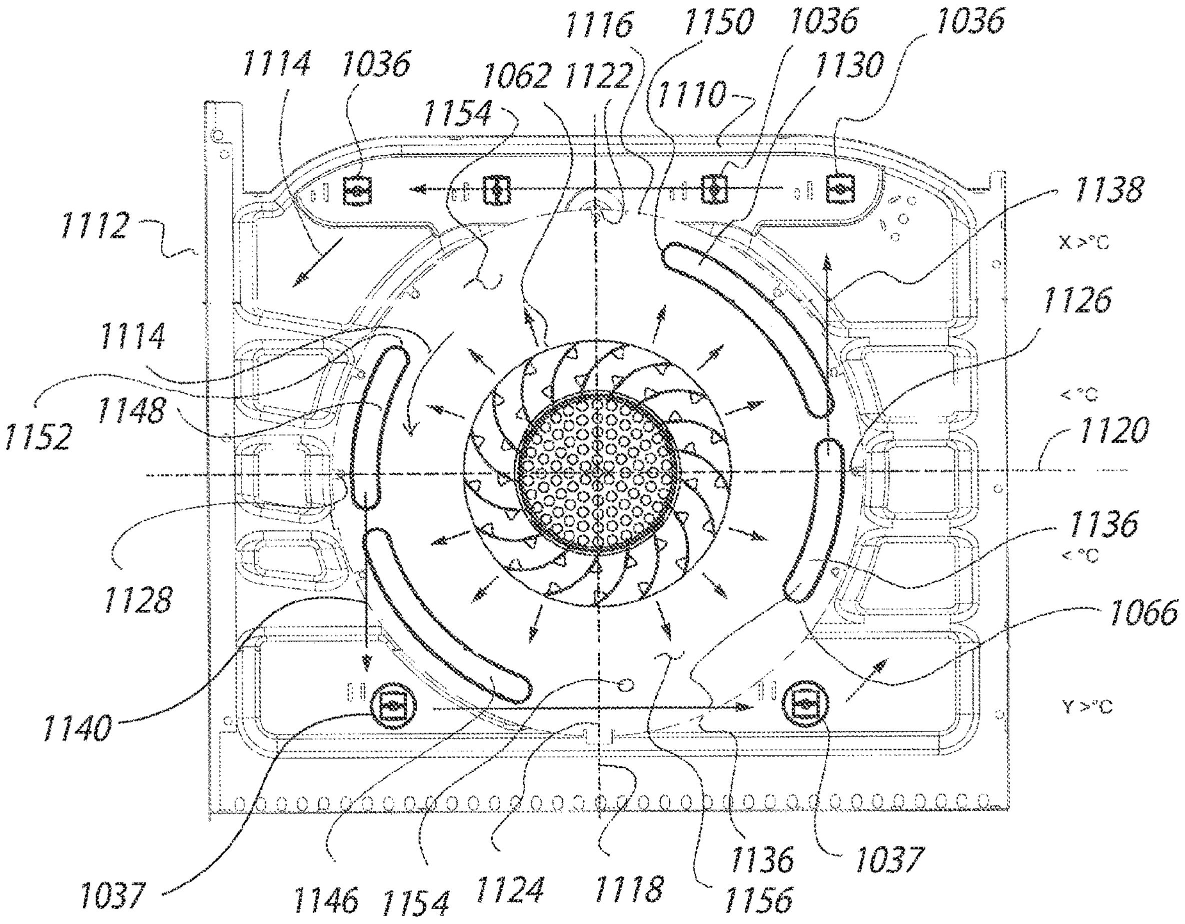
FIG. 8 is a schematic plan view of the impeller assembly shown in FIG. 7.

In the embodiment as shown in FIG. 8, the relationship between the impeller, the vents, and the heating elements in a convection oven is illustrated. In this example, the view is taken from the cooking cavity 1030 of the oven 1000, looking toward a left side interior wall 1110. The opening of the oven door 1006 would be on the left-hand side 1112. In the depicted embodiment, the oven 1000 includes four upper heating elements 1036 and two lower heating elements 1037. It will be appreciated that in other embodiments (not shown), the oven 1000 may be provided with any number of upper and lower heating elements 1036 and 1037.

The impeller 1062 is visible in FIG. 8, although it is understood to be positioned behind both the wall 1110 and the front surface 1066 of the enclosure assembly 1064 (the surface 1066 being optional and not shown). It will be understood that the discharge vents are in this example, generally equally sized and aligned with like openings 1096 in the front surface 1066 of the enclosure assembly 1064. In this example, the impeller 1062 rotates anti-clockwise along direction 1114 when viewed from behind the impeller 1062, or clockwise when viewed from the cooking cavity 1030.

The interior wall 1110 in the area in the front 1066 can be thought of as a circle 1116 that is subdivided into four quadrants. The quadrants are defined by a vertical axis 1118 that passes through the rotational centre of the impeller 1062 and a horizontal axis 1120 that also passes through the rotational centre of the impeller 1062. The quadrants are understood to be horizontal and vertical subdivisions defining a clock face with the nominal twelve o'clock position at the vertical maximum height 1122 of the circle 1116. The six o'clock position is located at the vertical minimum 1124 of the circle 1116. The three o'clock position 1126 and the nine o'clock position 1128 are located along the horizontal axis 1120 passes through the centre of the impeller 1062.

As suggested by FIG. 8, a primary discharge vent 1130 of the wall 1110 is located entirely in the first quadrant (between the twelve o'clock and three o'clock positions) when the impeller 1062 rotates in a clockwise direction when seen from the oven cavity. In the depicted embodiment, the discharge vent 1130 is generally centred between the twelve o'clock and the three o'clock position, and preferably extends between the one o'clock position and about the two-thirty position. The primary discharge vent 1130 is located below the two rear upper heating elements 1036. The primary discharge vent 1130 is preferable arch-shaped and lays on a diameter that is smaller than the aforementioned circle 1116.

In this example, the primary discharge vent 1130 is provided with a secondary vent 1136. The secondary vent 1136 lays partially in the first quadrant and partially in the second quadrant (between the three o'clock and the six o'clock positions). The secondary vent 1136 extends from approximately the two-thirty position to the four o'clock position. The arrangement of the vents 1130, 1136 may at least ensure that air that is expelled from the vents 1130, 1136 travels generally upwardly in a direction 1138 toward the upper heating elements 1036. The helical movement of the air that is discharged from the vents 1130, 1136 carries the flow across the upper heating elements 1036 towards the front of the oven 1000 where it is then directed generally downwardly in a downward direction 1140 toward the lower heating elements 1037.

The orientation of the primary and optional secondary vents 1130, 1136 is repeated in a diametrically opposite array with respect to primary and secondary lower vents 1146 and 1148. The primary lower vent 1146 is located entirely within and preferably centered in the third quadrant (between the six o'clock and the nine o'clock positions). The secondary vent 1148 is located partially within the third quadrant and partially within the fourth quadrant (between the nine o'clock and the twelve o'clock positions). It will be appreciated that in other embodiments (not shown), any number of primary and secondary vents may be provided, or alternatively, a single elongated vent may be provided in lieu of the separate primary and secondary vents 1130, 1136 or 1146, 1148.

It will be appreciated that in the depicted embodiment, there are no substantial vent openings in the area between an upper end 1150 of the upper primary vent 1130 and an upper end 1152 of the lower or left side secondary vent 1148. This area defines a dead zone 1154 and its diametrically opposed companion dead zone 1156 may at least maintain optimised characteristics of the airflow being discharged through the vents 1130, 1136, 1146, 1148, and ultimately towards the various upper and lower heating elements 1036 and 1037. It will be understood that relatively small openings can be provided in the dead zones 1154, 1156 without compromising the optimisation of the aforementioned flows.

The aforementioned arrangement of primary and secondary vents has been found to provide a generally helical flow which is optimised for delivering the air vent's discharge toward and across the heating elements wherein the air is heated before the air contacts food being cooked in the cooking cavity.

Figure 9:
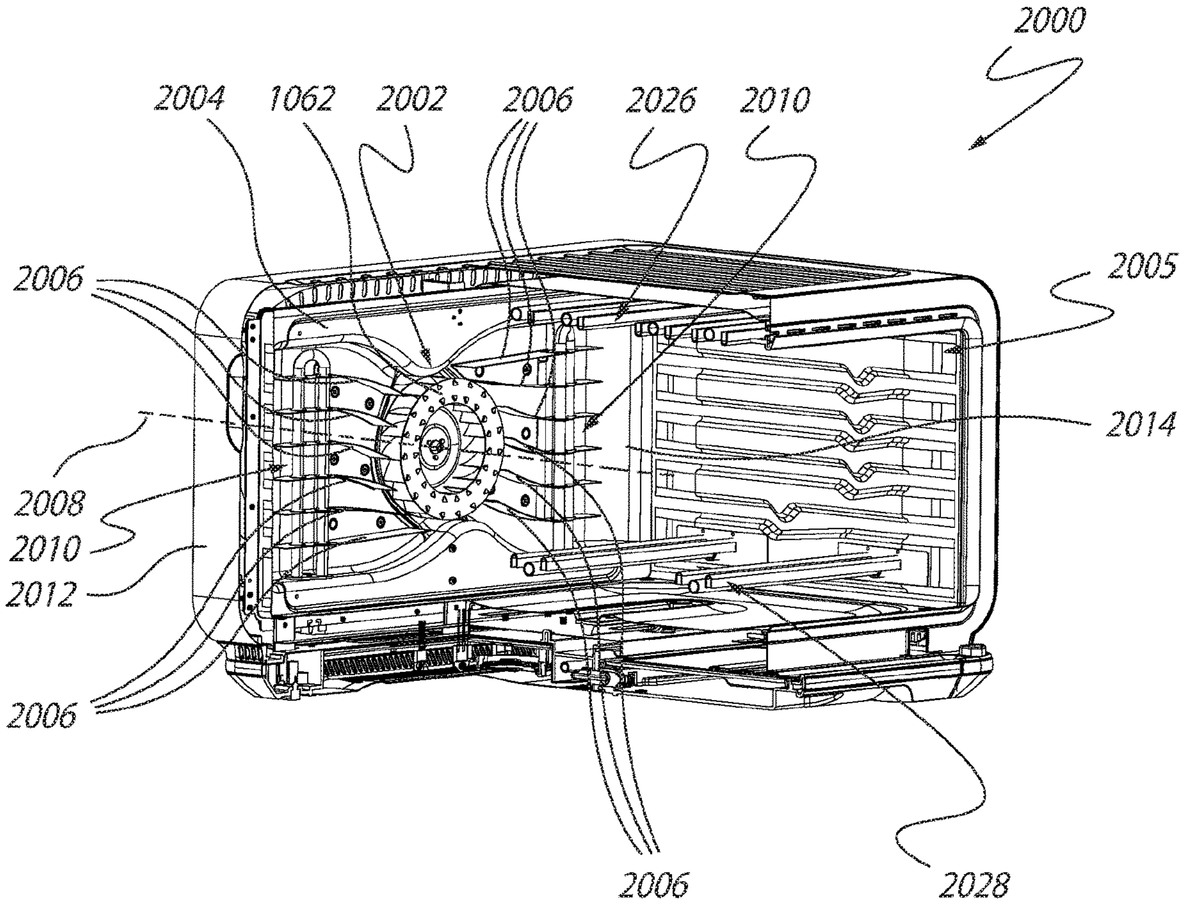
FIG. 9 is a schematic isometric sectioned view of a second embodiment of an oven.
Figure 10:
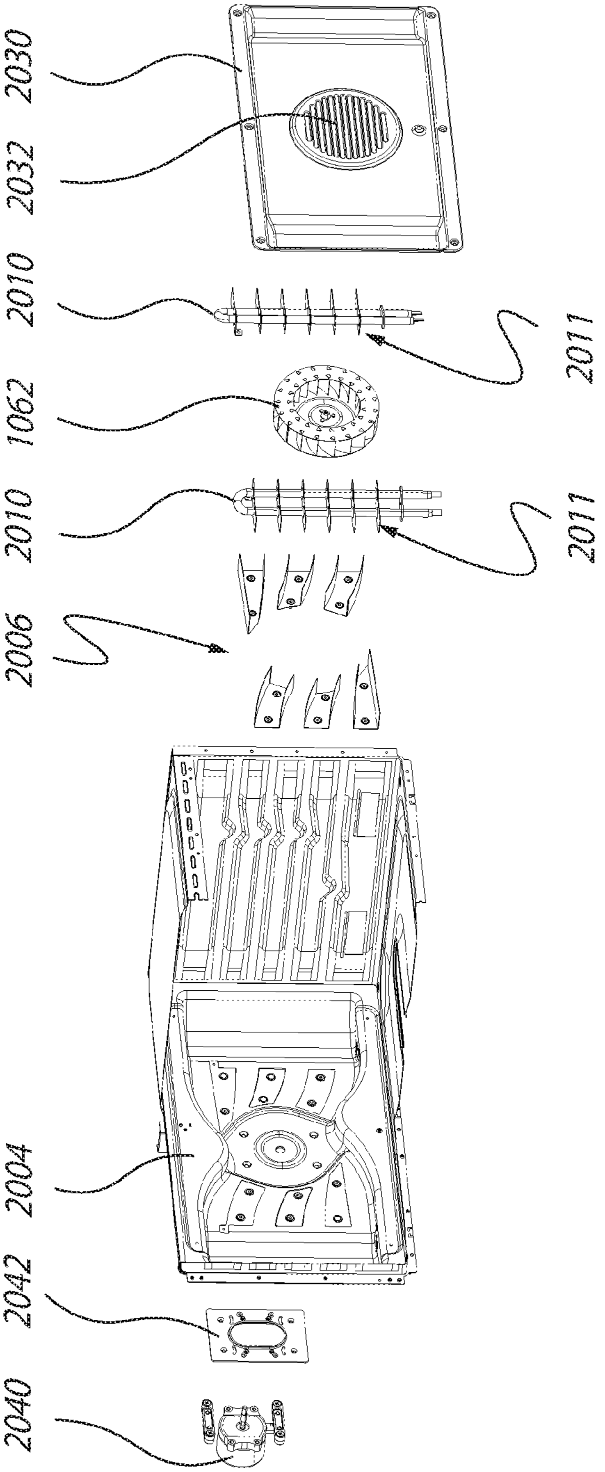
FIG. 10 is a schematic exploded isometric view of the oven shown in FIG. 9.

In FIGS. 9 and 10 of the accompanying drawings, there is schematically depicted a convection system for an alternative embodiment of an oven 2000, which operates in generally the same manner as the oven 1000 described above, with like reference numerals being used to indicate like features. However, in this embodiment, an inlet manifold 2002 of the oven 2000 is located on a rear interior wall 2004 of the oven 2000. Air is received into the center of the rear wall 2004 and blown through the inlet manifold 2002 via the impeller 1062 and into oven cooking cavity 2005. The inlet manifold 2002 and the impeller 1062 are positioned on a central axis 2008 that generally corresponds to the center of the rear wall 2004.

In the depicted embodiment, the inlet manifold 2002 includes a plurality of air guides or vanes 2006 that at least partially surround the impeller 1062, and a pair of vertical heating elements 2010 located on either side of the impeller 1062. The plurality of air guides or vanes 2006 are assembled to the rear wall 2004 and provide channels that extend generally transversely from the central axis 2008 towards either a left side portion 2012 or a right side portion 2014 of the cooking cavity 2005. The pair of vertical heating elements 2010 also each include a series of air guide portions 2011 (see also FIGS. 13A and 13B) that are aligned with and correspond to the channels of the air guides or vanes 2006. In the depicted embodiment, six air guides or vanes 2006 extend from the central axis 2008 towards the left side portion 2012, and similarly, six air guides or vanes 2006 extend from the central axis 2008 towards the right side portion 2012. The air guides or vanes 2006 are spaced apart from one another along a vertical height of the rear wall 2004. It will be appreciated that in other embodiments (not shown), any number of air guides or vanes 2006 may be provided.

Figure 11:
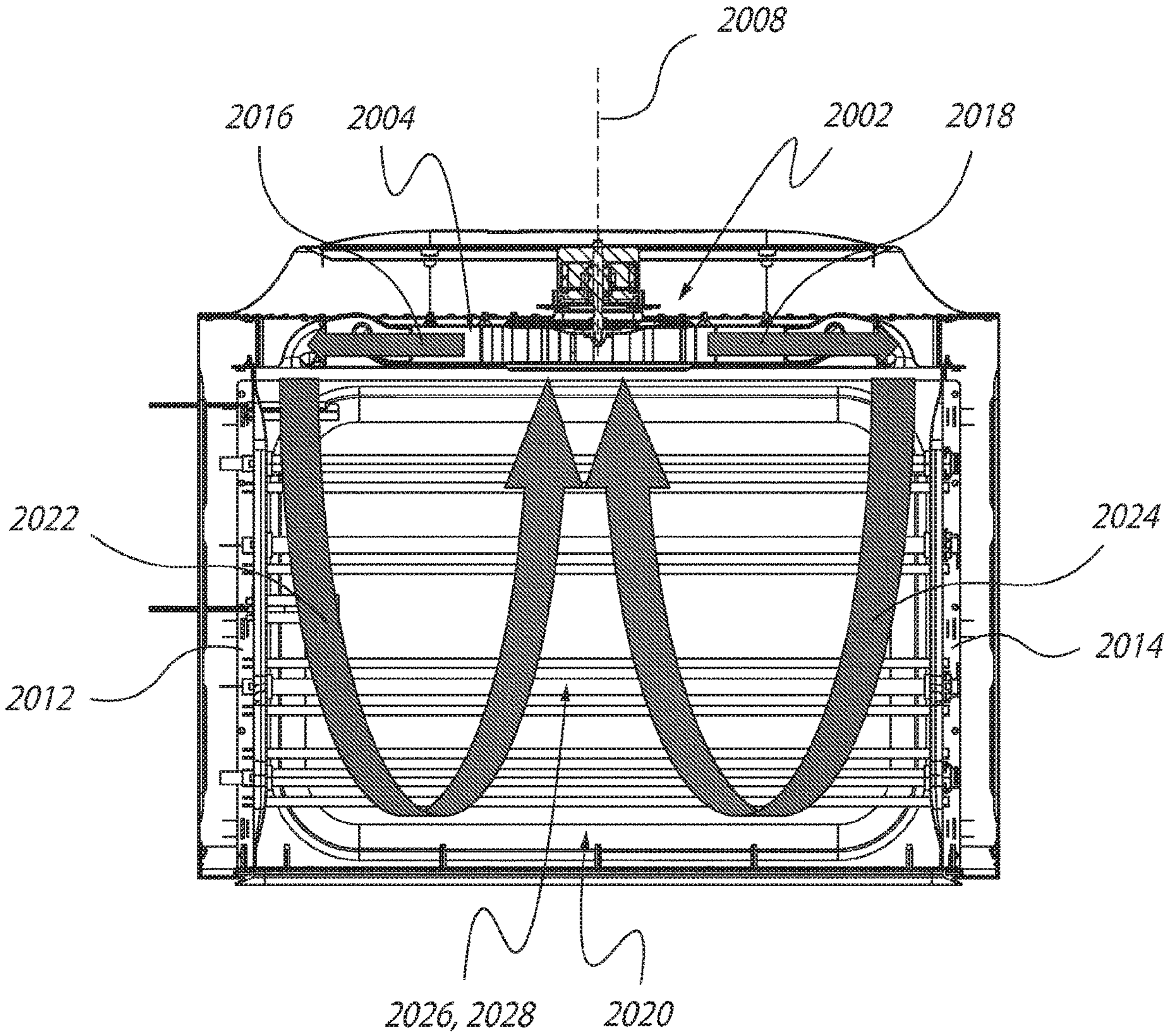
FIG. 11 is a schematic top view of the airflow in the oven shown in FIG. 9.

As best shown in FIG. 11, the inlet manifold 2002, with the assistance of the air guides or vanes 2006, directs air from the impeller 1062 along a generally transverse direction from the central axis 2008 towards the left and right side portions 2012 and 2014 of the oven 2000. Accordingly, the air moves generally linearly along opposing paths 2016 and 2018, across the vertical heating elements 2010, and towards the left and right side portions 2012 and 2014, respectively. The air then moves towards a front portion 2020 of the cooking cavity 2005, across upper and lower heating elements 2026 and 2028, and back again towards the rear wall 2004 along opposing paths 2022 and 2024, again across the upper and lower heating elements 2026 and 2028. This air movement creates two 'cells' of strong air circulation defined by the opposing paths 2022 and 2024, which is facilitated by the location and geometry of the inlet manifold 2002 in conjunction with the arrangement of the air guides or vanes 2006 and the impeller 1062. It will be appreciated that the number, positioning and curvature of the air guides or vanes 2006 matches the air flow generated by the impeller 1062. This may at least ensure that the air flow is evenly distributed, and little resistance is encountered when capturing and redirecting the air through the inlet manifold 2002. The increased even air flow may thus allow for more stable temperatures within the cooking cavity 2005, and even cooking across the multiple rack positions simultaneously. Additionally, it will be appreciated that the increased or faster air flow may at least reduce the boundary layer of air around the food that is being cooked, resulting in faster heat transfer and faster cook times.

Figure 12:
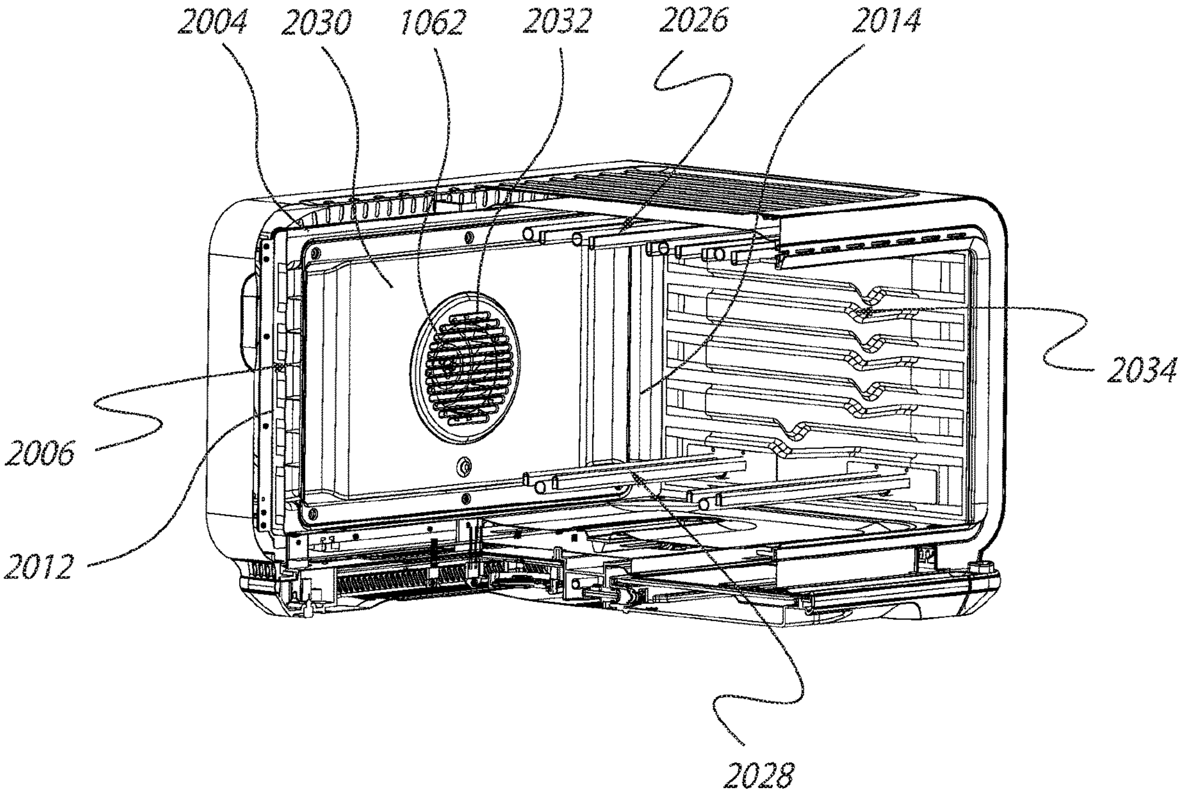
FIG. 12 is a further schematic isometric sectioned view of the oven of FIG. 9.

In FIG. 12, the oven 2000 is shown with a pressure plate or cover 2030 having a centrally-located mesh or grating portion 2032. The cover 2030 is positioned in the cooking cavity 2005 adjacent the rear wall 2004 and the air guides or vanes 2006, with the mesh or grating portion 2032 being located to extend across the impeller 1062. Accordingly, the cover 2030 may at least facilitate the flow of air along the air guides or vanes 2006 initially along the paths 2016 and 2018, before being directed along the paths 2022 and 2024. The left and right side portions 2012 and 2014 of the cooking cavity 2005 also include rack guide portions 2034 that interact with and hold wire racks or trays that are inserted into the cooking cavity 2005.

Returning to FIGS. 9 and 10, the structure and positioning of the vertical heating elements 2010 will now be described in further detail. In these Figures, a motor 2040 that drives rotation of the impeller 1062 is shown, and is mounted behind the rear wall 2004 via a mounting member, such as mounting bracket or plate 2042. As discussed above, the pair of vertical heating elements 2010 are located on either side of the impeller 1062, and each include air guide portions 2011 (see also FIGS. 13A and 13B) that are aligned with and correspond to the channels of the air guides or vanes 2006. It will be understood that the vertical heating elements 2010 are spaced at a sufficient distance from the central axis 2008 (and thereby from the motor 2040) so as to prevent overheating of the motor 2040 during operation of the oven 2000. The vertical heating elements 2010 may each be spaced at a distance of between approximately 127 to 145 mm from the central axis 2008. It will be appreciated that this distance may at least allow for higher wattage heating elements to be utilised, which may at least allow for faster cook times to be achieved without damaging the performance of the motor 2040.

Figure 13A:
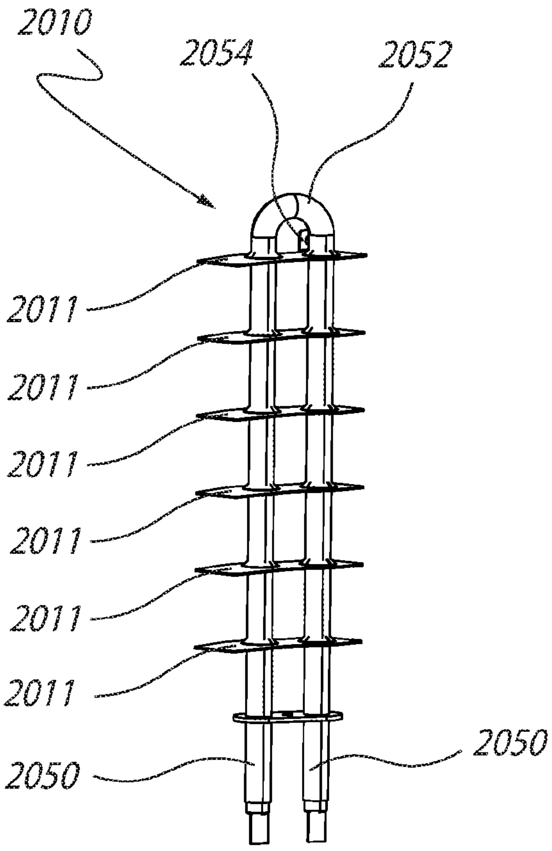
FIGS. 13A and 13B are schematic isometric views of heating elements of the oven shown in FIG. 9.
Figure 13B:
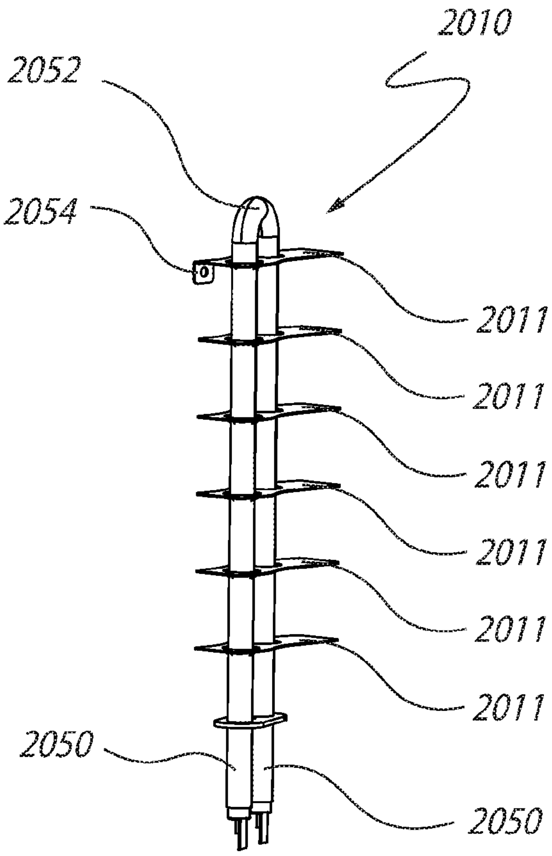
Figure 13C:
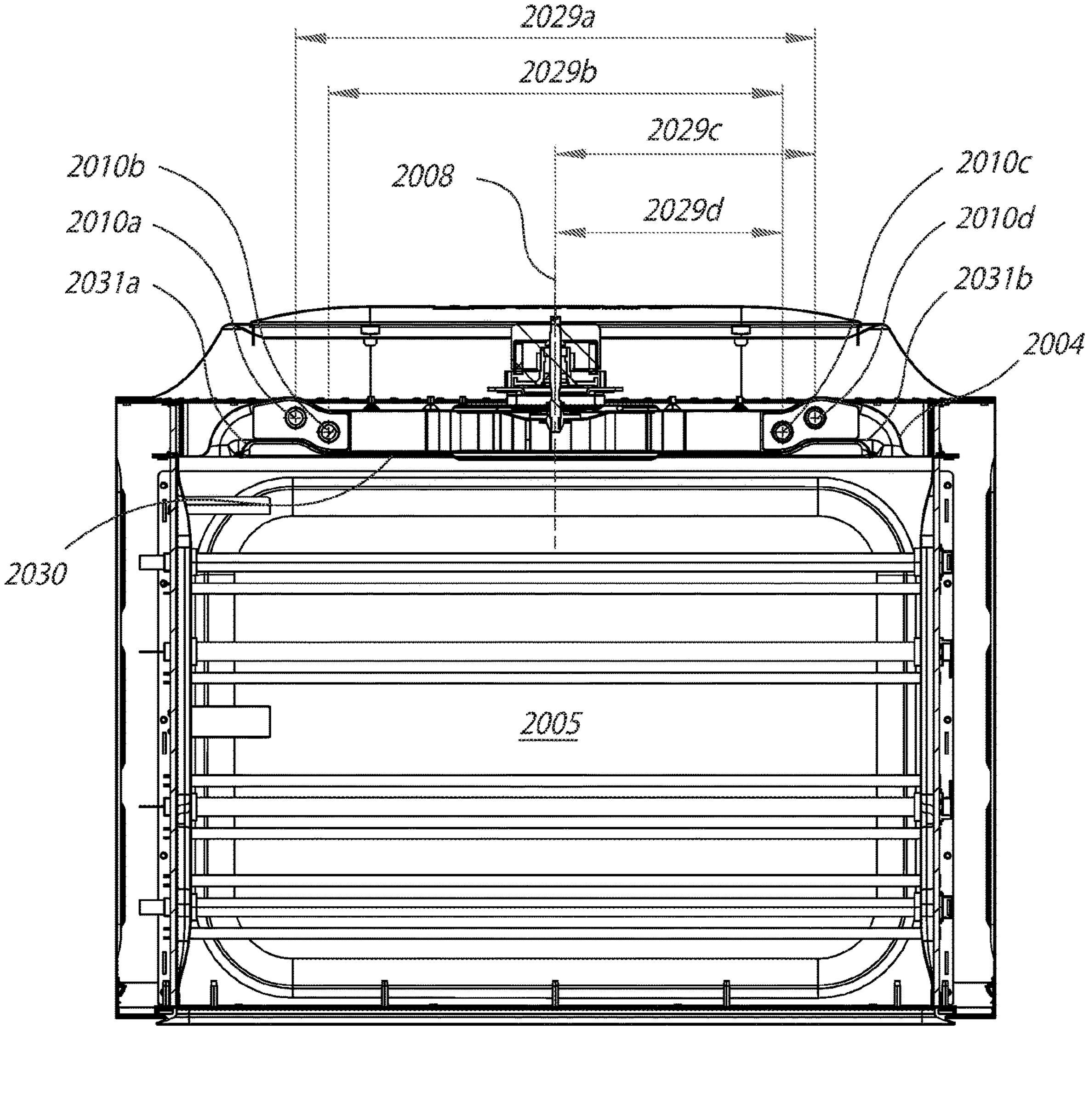
FIG. 13C is a schematic top section view of the oven shown in FIG. 9.

In FIG. 13C, there is also depicted the various exemplary dimensions from the central axis 2008 to the various heater elements. For example, a distance 2029*a* of about 290 mm may be provided between heater element portions 2010*a* and 2010*d* of the pair of heating elements 2010, and a distance 2029*b* of about 254 mm may be provided between heater element portions 2010*b* and 2010*c* of the pair of heating elements 2020. Further, a distance 2029*c* of about 145 mm may be provided between the central axis 2008 and heater element portion 2010*d*, and a distance 2029*d* of about 127 mm may be provided between the central axis 2008 and heater element portion 2010*c*. In this way, the heater portions 2010*a*, 2010*b* form a first group pairing arranged adjacent to one of the lateral edges 2031*a* of the cover 2030, and the heater portions 2010*c*, 2010*d* form a second group pairing arranged adjacent to the other of the lateral edges 2031*b* of the cover 2030. When the heating elements 2010 are sufficiently energised, thermal electromagnetic radiation emitted from each of the heating elements 2010 is reflected by the rear wall 2004 into the cavity 2005 to form a visible illumination or 'red glow' emanating from behind the lateral edges 2031*a*, 2031*b* of the cover 2030. The 'red glow' provides a visual indication to a user of an operating state of the oven 2000 and, more particularly, the temperature of the cavity 2005. The 'red glow' would be visible during the initial heat up phase of the cook cycle of the oven 2000. In a typical existing convection configuration, the heat source is often and almost always hidden. In the present arrangement, however, the visible 'red glow' allows the user to see what would otherwise be hidden which may provide valuable safety information to the user. Additionally, the visible 'red glow' allows for an 'at a glance recognition' of the operating state of the oven 2000 even when remote from the interface 1004 of the oven 2000.

As best shown in FIGS. 13A and 13B, each of the vertical heating elements 2010 has a generally invented U-shaped structure defined by two spaced apart parallel and elongated portions or legs 2050 connected at their upper ends by a curved portion 2052. The vertical heating elements 2010 also each include at least one mounting portion 2054 located towards an upper part of the U-shaped structure adjacent the curved portion 2052. The at least one mounting portion 2054 may be the form of a bracket having an aperture therethrough for insertion of a fastener (e.g. a screw or a rivet). The location of the at least one mounting portion 2054 allows the heating element 2010 to be mounted vertically towards a top surface of the inlet manifold 2002 or the rear wall 2004, which may at least prevent fluid or grease from leaking out from the cooking cavity 2005. It will be appreciated that the U-shaped structure may also facilitate the use of a longer heating element length to ensure that a correct wattage density may be achieved.

It will also be appreciated that the structure and arrangement of the heating elements 2010 may also allow for the air guides or vanes 2006 to be positioned between the impeller 1062 and the heating elements 2010, which may at least ensure that air flow from the impeller 1062 is captured directly by the air guides or vanes 2006. This is in contrast to a typical coil heating element which may interrupt the airflow as soon as it is expelled from an impeller.

Figure 14A:
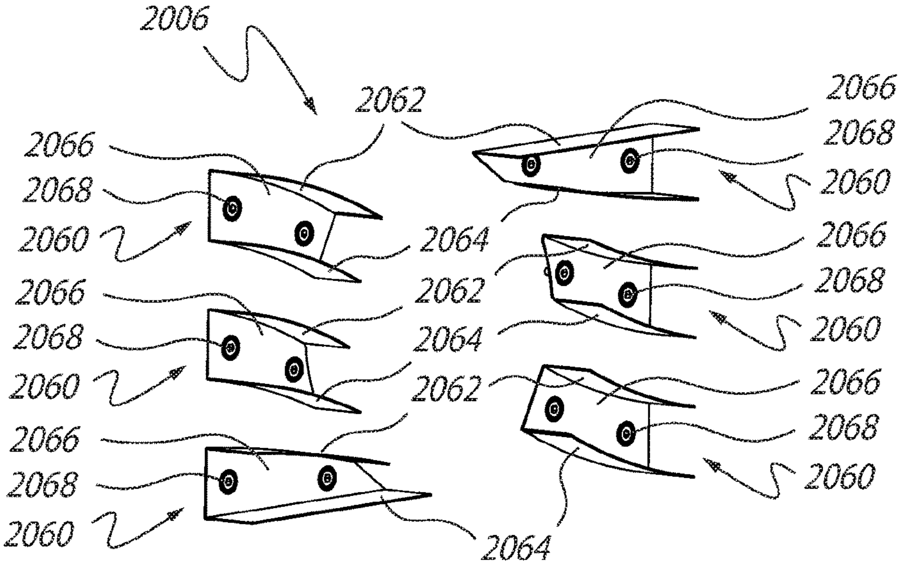
FIG. 14A is a schematic isometric view of air guides or vanes of the oven shown in FIG. 9.

Additionally, the form (i.e. curvature) and positioning of the air guides or vanes 2006 may at least reduce turbulence in the airflow, thus resulting in a quieter and more efficient oven operation. As best shown in FIG. 14A, the air guides or vanes 2006 that at least partially surround the impeller 1062 are provided by a series of vane units 2060, with each vane unit 2060 comprising an upper vane 2062 and a lower vane 2064. The upper and lower vanes 2062 and 2064 are connected by a backing portion 2066 to define a channel therebetween. In FIG. 14, three left side vane units 2060 and three right side vane units 2060 are provided to define the twelve air guides or vanes 2006 that extend from the central axis 2008 towards the left and right side portions 2012 and 2014 as described earlier.

The backing portion 2066 of each vane unit 2060 includes wall mounting portions or apertures 2068 to facilitate the mounting of the vane unit 2060 to the rear wall 2004/inlet manifold 2002 of the oven 1000. In the depicted embodiment, the backing portion 2066 extends vertically whilst the upper and lower vanes 2062 and 2064 extend transversely therefrom. When the vane unit 2060 is mounted to the rear wall 2004/inlet manifold 2002, the upper and lower vanes 2062 and 2064 extend towards the cooking cavity 2005 of the oven 1000. The termination point of vane unit 2060 may also include a crinkle curvature or geometry, which is understood to reduce the whistling sound created as the air travels past the heating elements 2010. In particular, it will be appreciated that the undulation introduced by the crinkle curvature assists with dispensing and mixing air having different temperatures.

Impeller Design

The design of the impeller 1062 is understood to incorporate a number of complex variables, for example:

a) Internal diameter

The size of the internal diameter of the impeller (i.e. the impeller eye) dictates the amount of air intake possible.

b) External diameter

The size of the external diameter of the impeller (i.e. the overall size of the impeller) dictates the length and number of the impeller blade.

c) Number of impeller blades

Given suitable spacing, more blades often equate to high amounts of airflow.

d) Impeller blade curvature

Unlike flat blades, which draw air by creating low pressure when air has been pushed away from the impeller eye, curved blades may "scoop" air and allow for a higher capture rate. A fine balance is required to ensure that the blade angle is tangent to the impeller eye to maximise air output.

e) Weight

The impeller design, material and thickness dictate the weight of the impeller, which has flow on effects to the performance and longevity of the motor. Material selection, thickness and weight contribute also to the impeller's ability to flex and warp during use. This warping can cause vibration at high speeds leading to the creation of noise. Whilst a heavier impeller is easier to balance, it places more stress on the motor and reduces the speed in which the motor can spin at, thereby reducing the possible air output of the impeller.

Figure 14B:
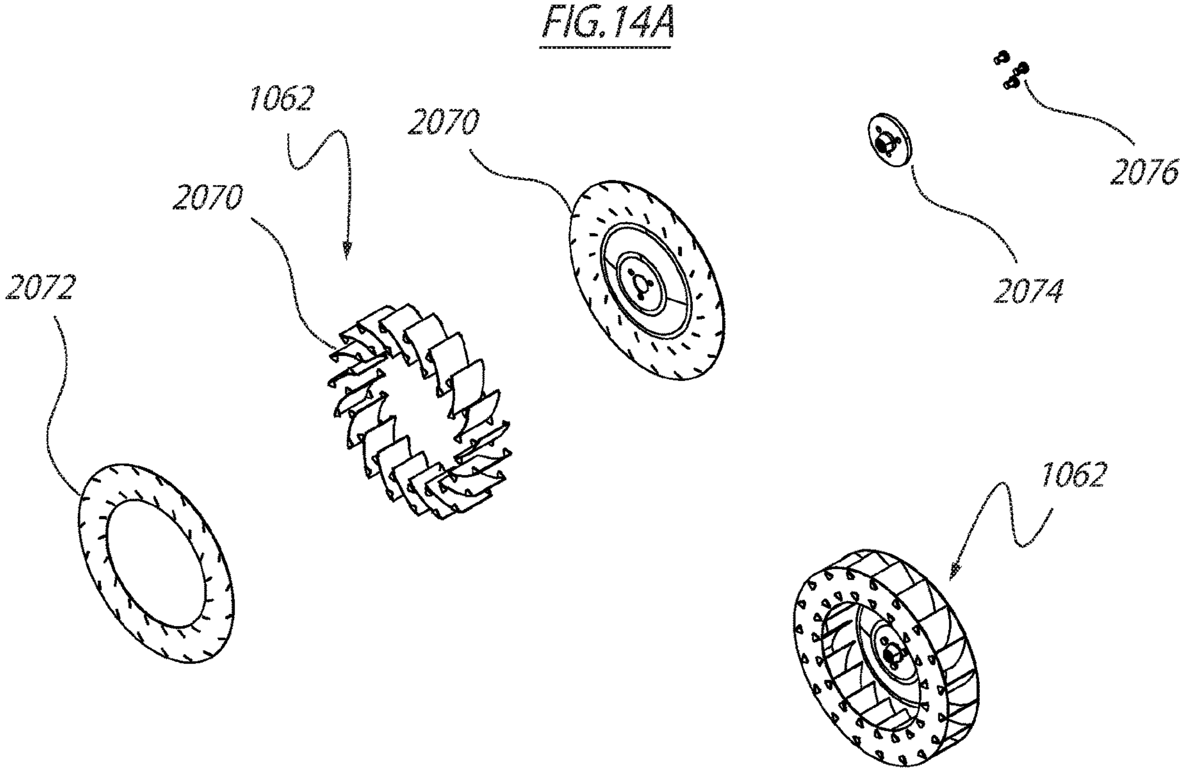
FIG. 14B is a schematic exploded isometric view of an impeller of the oven shown in FIG. 9.
Figure 15:
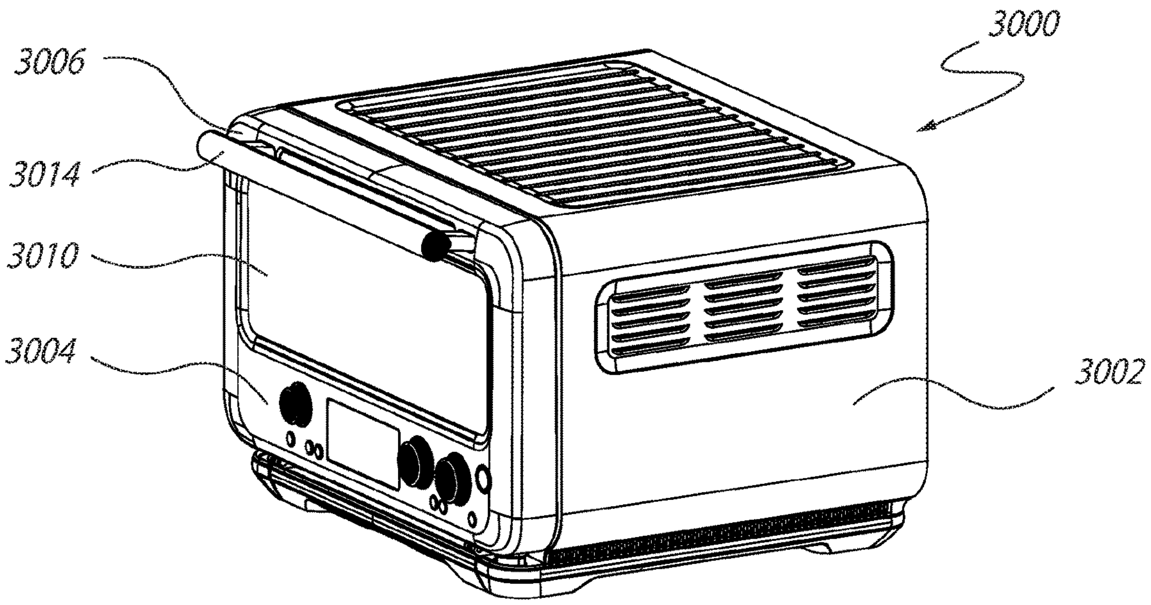
FIG. 15 is a schematic isometric view of a third embodiment of an oven in a closed configuration.
Figure 16:
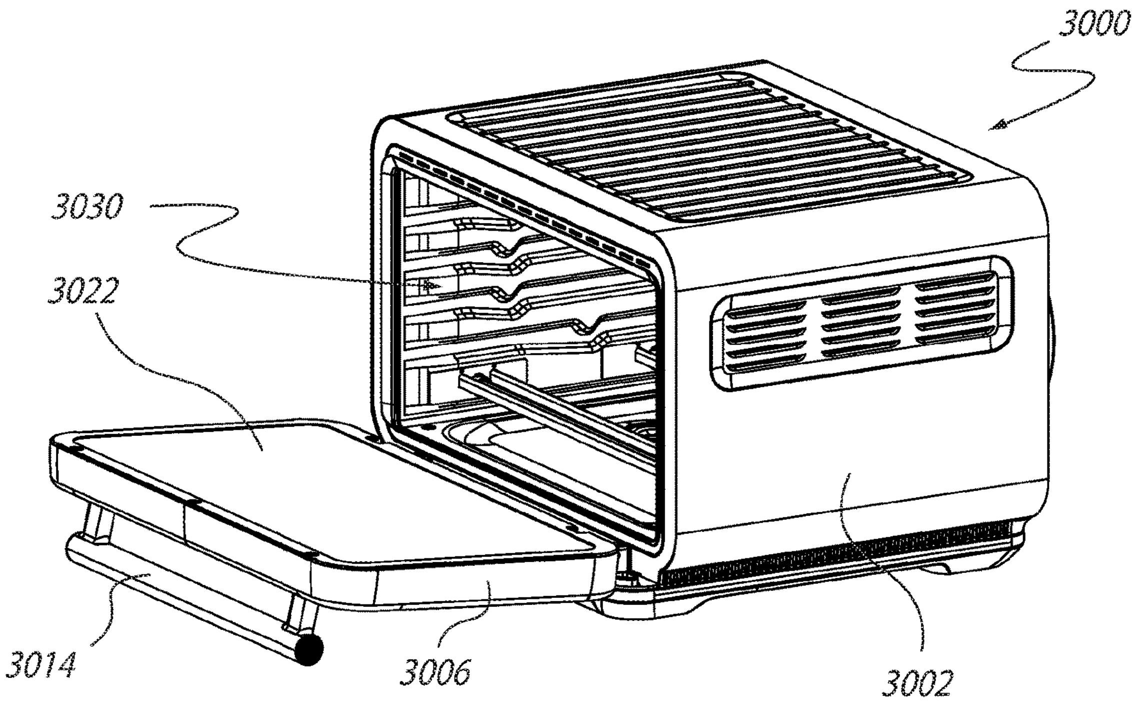
FIG. 16 is a schematic isometric view of the oven shown in FIG. 15 in an open configuration.

An exploded view of the structure of the impeller 1062 in an exemplary embodiment is shown in FIG. 14B. The impeller 1062 in this example includes a plurality of blades 2070 held together by circular pads 2072 and various fastening means 2074, 2076.

Motor Cooling System

Traditional motors used in convection ovens are AC brushed shaded pole motors, which known for being simple, robust and affordable. The motor employed in the oven of the present disclosure is a Brushless DC (BLDC) motor, which is popular in devices such as drones and electronic cooling fans. These motors are known for their compact size, ability to reverse direction, and to vary speed. Whilst such motors are common in the aforementioned electrical applications, these motors are not typically found in high temperature environments such as ovens, as BLDC motors typically have a sensitivity to high temperatures. To assist the motor in maintaining a stable operational temperature, additional componentry is often used.

The section of the motor which rotates is called the rotor. This component also houses the permanent magnets and the motor shaft. It is common practice to design the rear of the rotor with surface cavities such as holes. However, this method does not ensure that air sufficiently penetrates the motor housing to cool the motor.

Occasionally, a rear mounted cooling fan is also employed to ensure that air can circulate inside the motor housing. This method requires a through shaft motor to allow an axial cooling fan to be mounted behind the rotor. This method, whilst effective, requires more componentry and space in the oven housing.

The benefits of using a BLDC motor is twofold. The smaller motor size may at least allow for the external oven unit size to be reduced. In addition, variable fan speeds may cater for differing food types. For example, delicate food items such as cakes may benefit from slow moving air, whilst other food types such as potatoes require faster moving, hotter air to ensure a fast, crispy result.

As discussed above, given that BLDC motors are foreign to the high-temperature oven environments, many elements of the motor are required to be specified to ensure correct motor operation in such high temperature environments. These areas of modification may include, for example:

i) Modification for high temperatures

Due to an onboard driver PCB and a low lubricant temperature rating, BLDC motors typically cannot safely operate over 55° C. Accordingly, the following modifications are envisaged to avoid motor failure:

Offboard driver PCB;

Increased lubricant temperature rating specification;

Radiant heat shields and insultation positioned around the motor;

Post machining of the motor shaft to reduce heat conduction into the motor housing; and Configuring a through shaft motor, to allow for a rear mounted cooling fan.

ii) Modification for high torque and RPM:

BLDC motors typically operate small impellers at high RPMs. Due to the construction and airflow requirement of an oven, an impeller to move large volumes of air is required. A motor which operates at sub-5000 rpm with sufficient torque to power a large impeller is envisaged.

In one embodiment of the present disclosure, a series of impeller fins are punched and formed outwardly from the rear surface of the rotor (motor bell) of the motor 2040. This design may at least allow for the rotor to act as a rear cooling impeller whilst the motor 2040 is in operation. It will be appreciated that this arrangement integrates the benefits of both traditional methods without the additional componentry or size. Unlike the traditional methods of cooling BLDC motors from the rear, this arrangement also does not require expensive manufacturing processes such as post machining, or the additional componentry such a rear mounted cooling impeller. The overall size of the motor assembly may also be kept to a minimum, thereby allowing a BLDC motor to operate safely in a hot and compact environment.

BLDC Motor Control

It is understood to be extremely difficult to ensure that no cold spots exist in an oven cooking cavity. In instances where air circulates at a slower speed, air temperatures and therefore cooking performance, may be adversely affected.

A BLDC motor may be utilised to create the opportunity to reverse the direction of impeller rotation for a selected percentage of time. This redirection of air disturbs the continuous flow, thus creating a temporary secondary air current. This variation may at least assist with making the air flow and temperature more uniform and consistent throughout the oven cooking cavity.

Additionally, an oven may be configured such that it houses two convection assemblies facing each other from opposite oven walls (e.g. left and right side oven walls). Both oven walls may be fitted with complete convection assemblies including heating elements, a BLDC motor, impeller, a pressure plate, and air guides or vanes.

In an embodiment of the present disclosure, an impeller that is designed for the reversing action includes a series of flat blades to ensure that air output is matched from both rotational directions.

The mirrored convection assemblies, when operational, may each create two sets of cells of moving air. The intersection of the two sets of cells is located at the centre of the cooking cavity. To ensure that this area is exposed to a consistent air speed and temperature, the motor of one convention assembly oscillates its speed at an inversed rate from the motor of the other connection assembly. The increase in speed from one motor is matched by the decrease in speed of the other motor, thereby causing the sets of cells to expand and contract, which creates a dynamic cell intersection point.

In FIGS. 14 to 21 of the accompanying drawings, there is schematically depicted a further alternative embodiment of an oven 3000, which operates in generally the same manner as the ovens 1000 and 2000 described above, with like reference numerals being used to indicate like features. In this embodiment, the oven 3000 includes a body 3002 and a hinged door 3006, which in turn includes a user interface portion 3004, a front glass viewing window or pane 3010, and a handle 3014. As best shown in the open configuration of door 3006 in FIG. 16 and the exploded parts view of the door 3006 in FIG. 21, the door 3006 also includes a rear glass pane 3022 which faces an interior or cooking cavity 3030 of the oven 3000.

Figure 17:
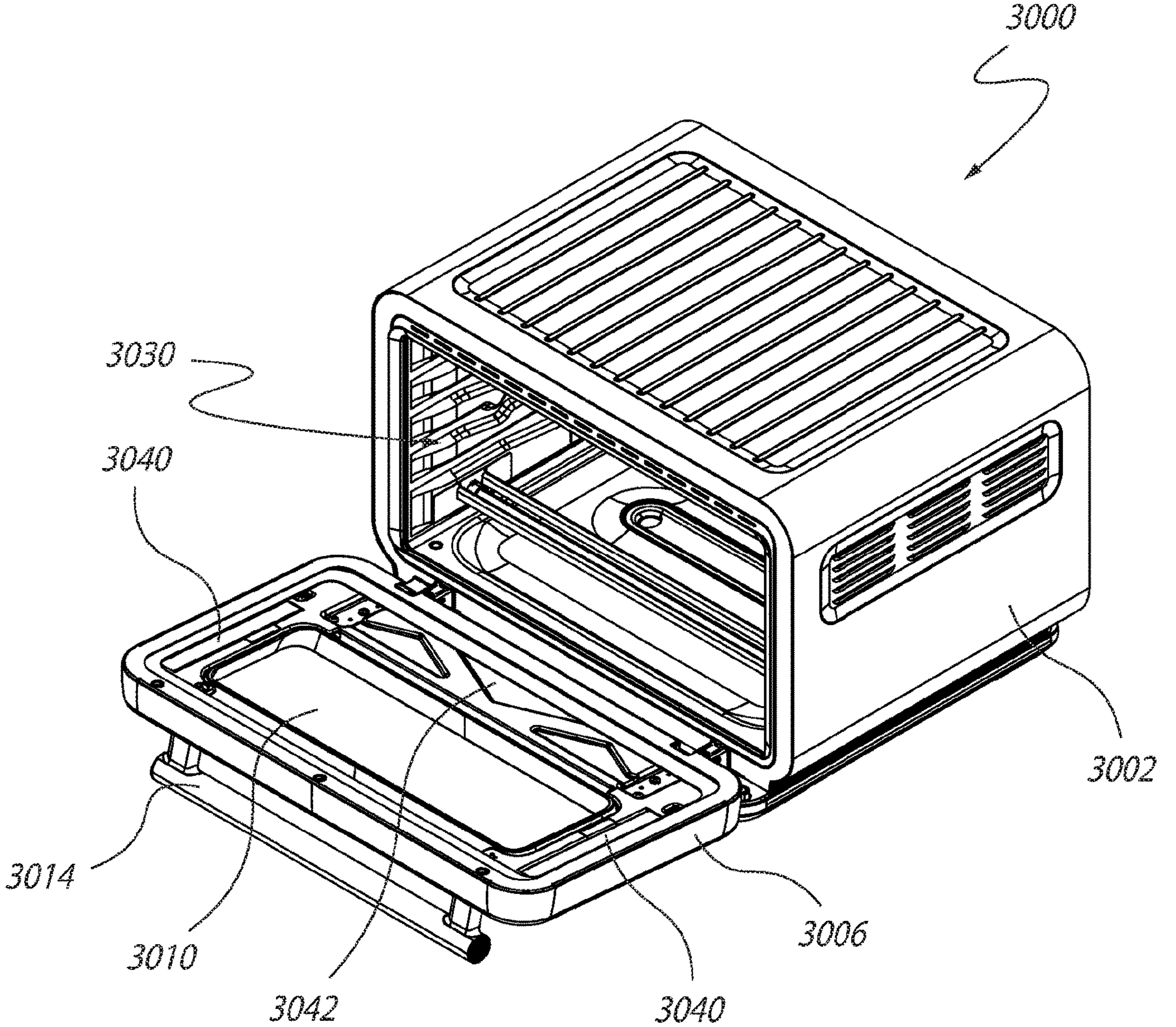
FIG. 17 is a further schematic isometric view of the oven shown in FIG. 15 in the open configuration.
Figure 18:
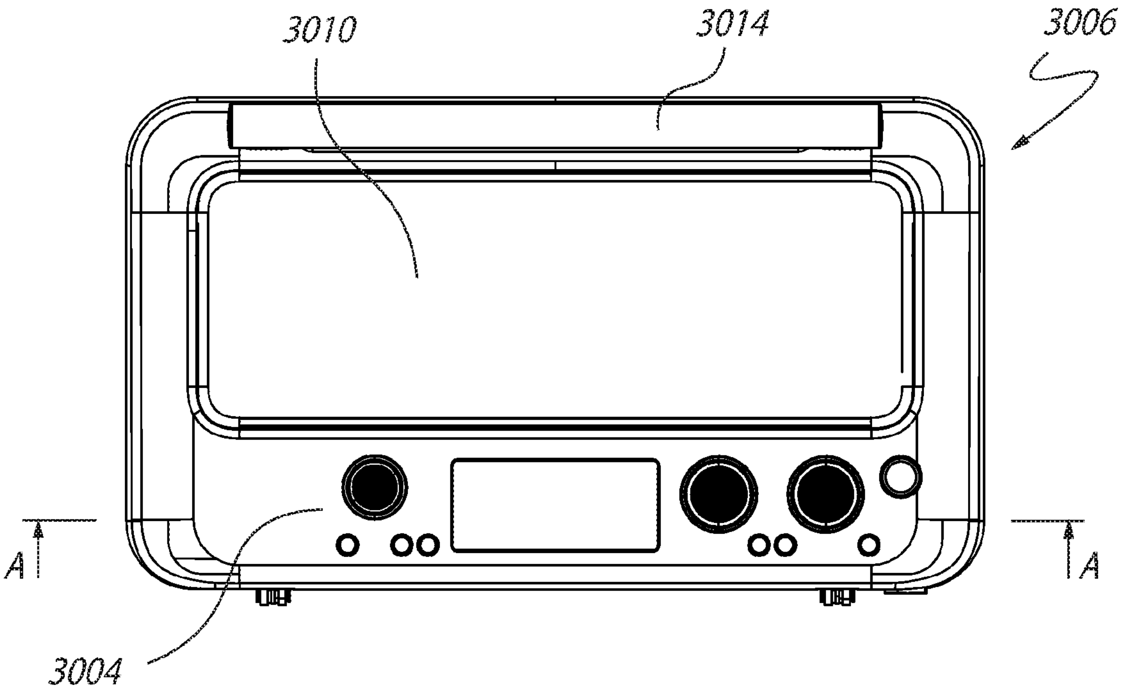
FIG. 18 is a schematic front view of a door of the oven shown in FIG. 15.
Figure 19:
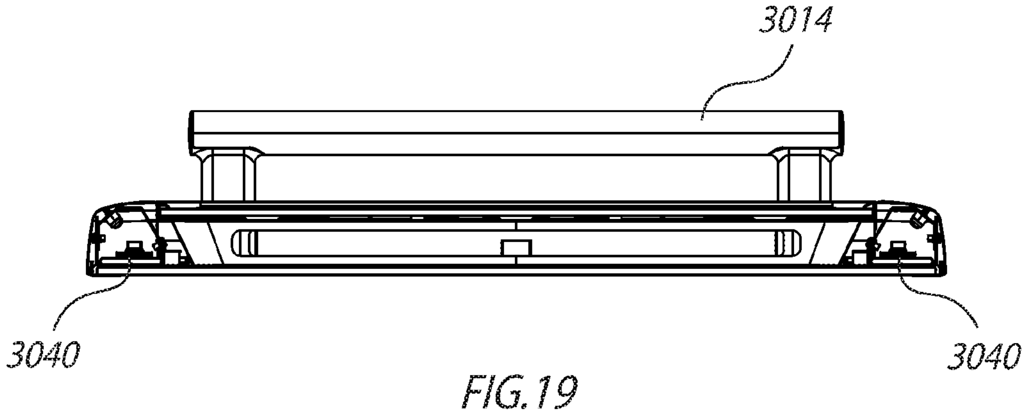
FIG. 19 is a schematic sectional view through line A-A of the door shown in FIG. 18.
Figure 20:
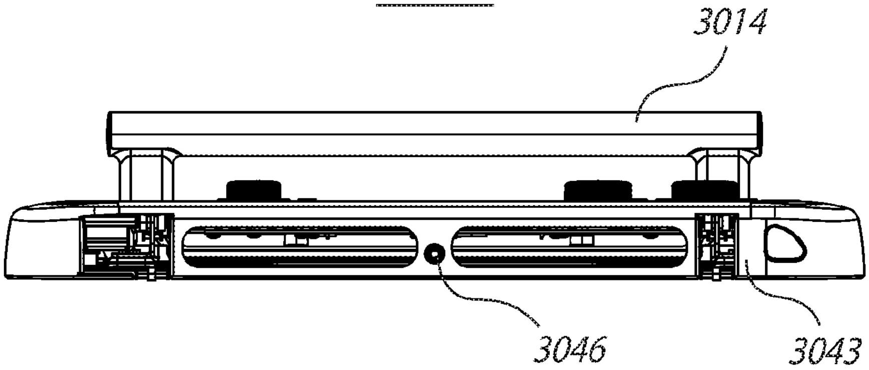
FIG. 20 is a schematic bottom view of the door shown in FIG. 18.
Figure 21:
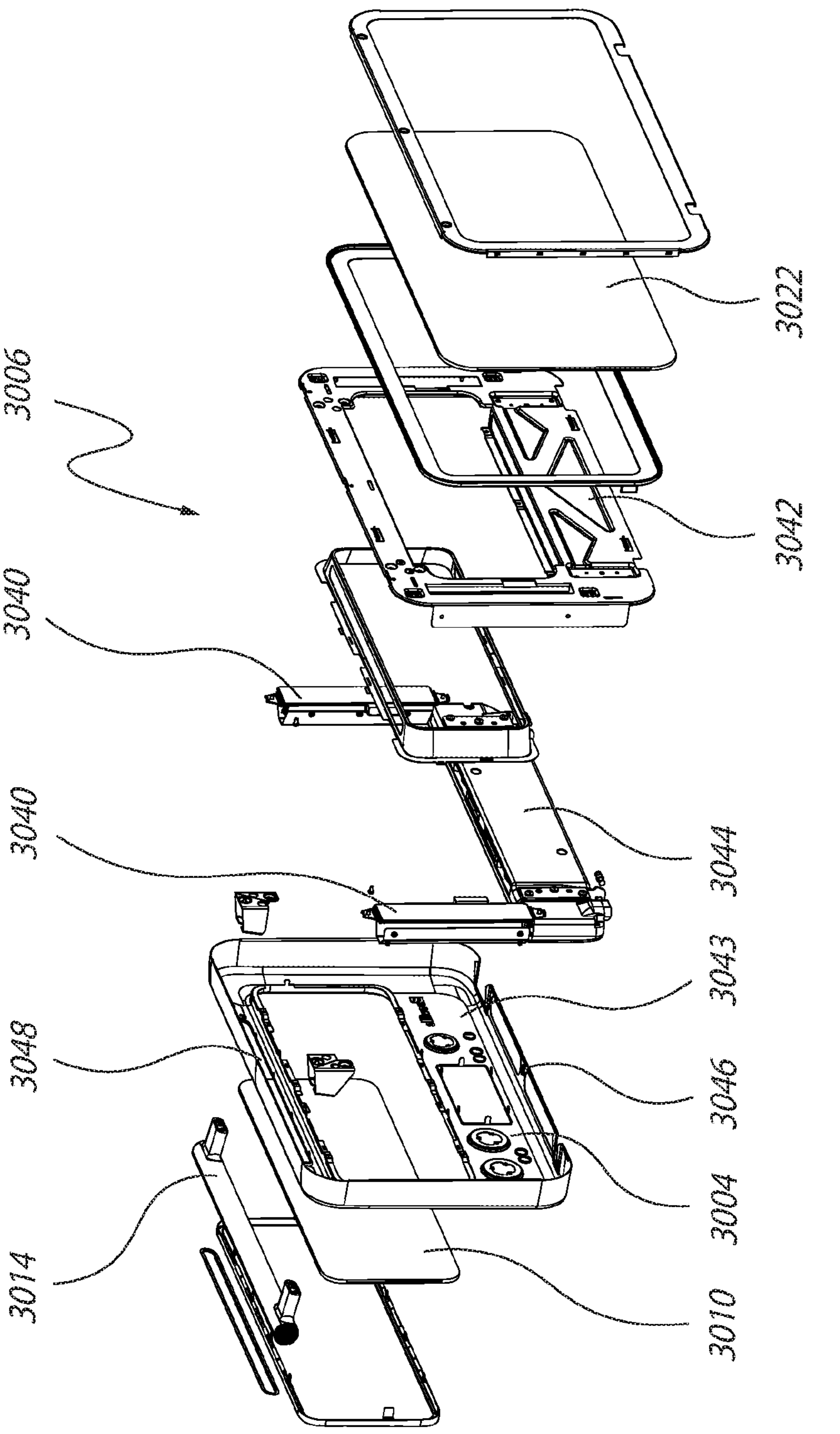
FIG. 21 is a schematic exploded parts view of the door shown in FIG. 18

FIG. 17 shows the door 3006 in the open configuration and with the rear glass pane 3022 hidden to show a pair of LED lights 3040 and a rear door frame 3042. Referring also to FIG. 21, and as will be described in further detail below, the control electronics (not shown) for the oven 3000 are housed in an electronics housing 3044, between the rear door frame 3042 and a front door frame 3043 (where the user interface portion 3004 is located. It will be understood that whilst the control electronics of the oven 3000 are located in or adjacent the door 3006, the power electronics (not shown) of the oven 3000 are located at rear of the oven 3000. In the depicted embodiment, the LED lights 3040 are mounted to the rear door frame 3042 and positioned on either side of the front viewing window or pane 3010. In the closed configuration of the door, the LED lights 3040 are operable to direct to light into the cooking cavity 3030, thereby reducing or avoiding the presence of shadows in the cooking cavity 3030 when food is being cooked. This is in contrast to prior art ovens which typically include lights on the side(s) of the cooking cavity itself, which may cause the presence of shadows. It will be appreciated that in other embodiments (not shown), any number of LED lights 3040 may be provided at any position on the door rear door frame 3042 or other components of the door 3006.

As described above, the control electronics of the oven 3000 are envisaged to be housed in the electronics housing 3044 of the door 3006. It is understood that typical ovens (i.e. countertop or built-in ovens) do not include control electronics in the door of the oven itself. This is because an oven door traditionally includes glass to allow viewing of the food being cooked in the cooking cavity, and the door is subject to high temperatures from the oven during operation. In typical ovens, the control electronics are positioned in a separate location away from the door so as to make use of cooler areas on the oven, and to also make use of areas on the oven which can be more easily cooled by cooling fans, for example. As such, oven control electronics are not typically included in the door of the oven itself. There are also additional difficulties due to the complexity of wire routing which must be provided to power the control electronics, and such wires may be subject to deformation over time due to the constant opening and closing motions of the door.

It is understood that a typical safe operating temperature of electronics is approximately degrees Celsius. Therefore, in appliances such as ovens, design parameters must be employed to ensure that the temperatures do not reach dangerous levels. There are two main methods of cooling typically used: active cooling and passive cooling.

Active cooling defines components which move air via moving parts in order to create negative temperature transfer. Traditionally, such components include fans such as centrifugal, axial and cross flow fans. Active cooling is often more effective than passive cooling, but may, however, be louder, more expensive and subject to failure.

Passive cooling defines a component or geometry which create negative temperature transfer without any moving parts. Traditionally, passive cooling can be achieved through components such as heat pipes or heat sinks to transfer heat from one location to another.

In the embodiment of the oven 3000 as depicted, natural convection is utilised in order to passively cool the temperature critical components (primarily the control electronics within the housing 3042). By utilising natural convection in the door 3006 of the oven 3000, it will be appreciated that the need to use cooling fans, for example, may be avoided.

In the depicted embodiment, the door 3006 includes an air channel that extends through the centre of the door 3006. A first opening 3046 (see FIGS. 20 and 21) located at the bottom of the front door frame 3043 provides an entrance point to the air channel, whilst a second opening (slot) 3048 located at a top portion of the front door frame 3043 provides an exit point from the air channel. It will be understood that the air channel thus passes through the electronics housing 3044 between the front pane 3010 and the rear pane 3022. As shown in the Figures, the second opening (slot) 3048 is, in a preferred form, an opening or slot that extends transversely through a front face of the front door frame 3043. The second opening (slot) 3048 is also envisaged to be concealed or at least partially hidden from view (when viewing the door 3006 from the front, in the closed configuration) by the handle 3014.

It will be understood that air rises as it is heated, and in the depicted embodiment, a rising current of air may pass through the air channel which runs through the centre of the door 3006 (i.e. between the first opening 3046 and the second opening 3048). This current of air may reduce the touch temperatures of the door 3006, as well as preventing the control electronics within the housing 3042 from reaching critical temperatures.

It will be appreciated that the second opening (slot) 3048 is located at the top portion of the front door frame 3042 to allow the heated air from the air channel to escape. The second opening (slot) 3048 is therefore strategically placed to: (a) allow the natural convection air current to exit through the top of the door 3006; (b) prevent the ingress of any potentially spilled liquids or debris by being located on the front face of the front door frame 3042 (and not a top surface of the door 3006); and (c) be concealed by the handle 3014 of the door 3006, thereby allowing a pleasing aesthetic to be maintained from the front view of the oven 3000.

The above arrangement may thus allow the oven 3000 to maintain safe temperature regulation throughout any cook temperature or duration that the oven 3000 may be operated for. Additionally, in the event of a power outage, or if the user was to remove the power cable abruptly, the natural convection cooling may at least allow the control electronics of the oven 3000 to cool down with little to no harm (e.g. overheating and failing).

Figure 22:
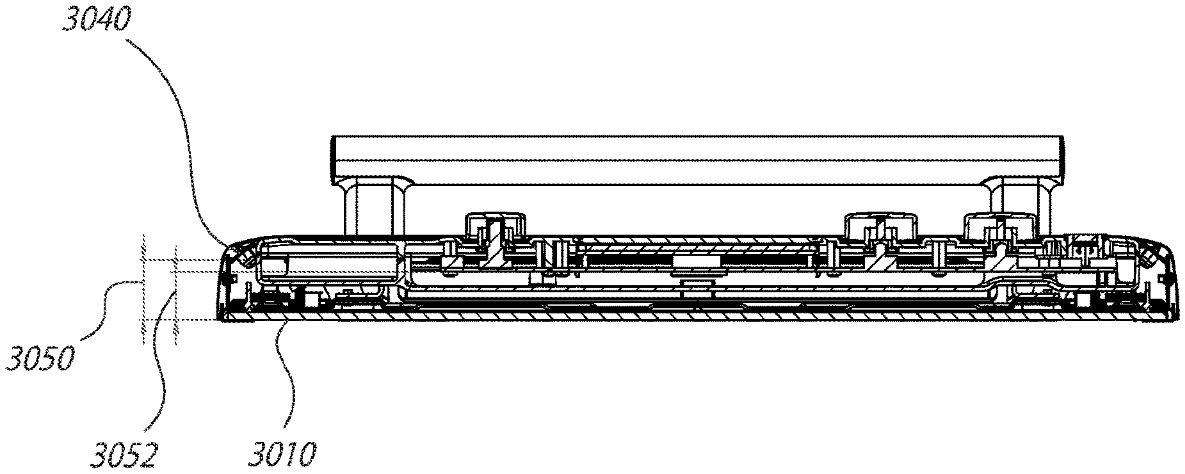
FIG. 22 is a top schematic section view of the door shown in FIG. 18.

Further, in the event that the door 3006 is opened after a high temperature cook, and subsequently left in the open configuration, the door 3006 would be positioned in a horizontal and not vertical position. Consequently, no air can cool the control electronics as the natural (vertical) convection path is no longer present. In this scenario, latent heat in the door 3006 may be released, causing a potentially dangerous temperature rise of the control electronics. As this scenario is envisaged to be an expected use case of the door 3006, the geometry, material and components of the door 3006 are designed to ensure that sufficient thermal buffer is present, to allow the oven 3000 to withstand this temperature rise scenario. For example, in the depicted embodiment, and as best shown in FIG. 22, a distance 3050 of about 30 mm may be provided between the LED lights 3040 and the front pane 3010, and a distance 3052 of about 25 mm may be provided between the control electronics and the front pane 3010.

Figure 23A:
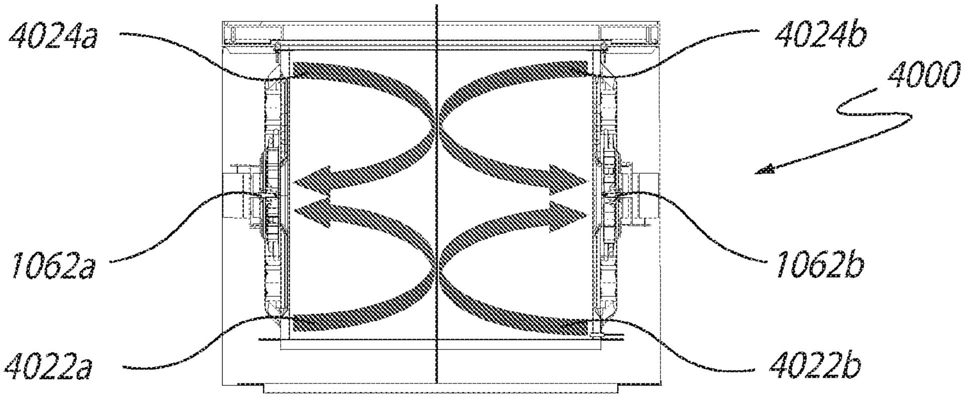
FIGS. 23A to 23C are schematic top views of the airflow in a further embodiment of a dual fan (impeller) oven.
Figure 23B:
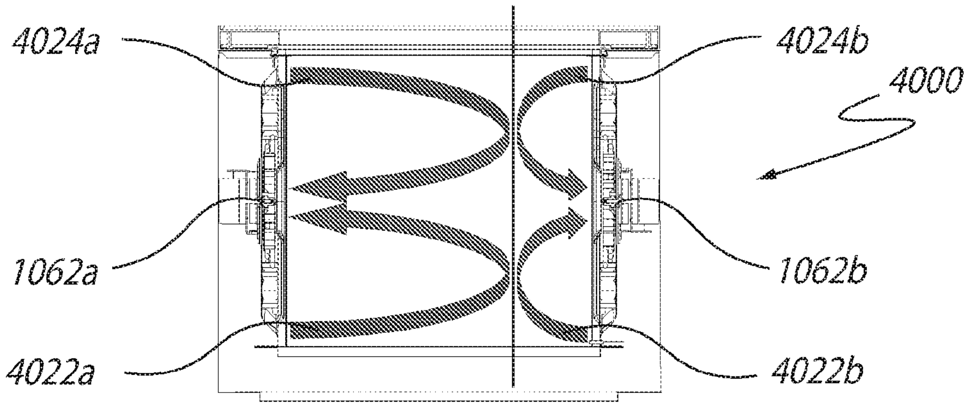
Figure 23C:
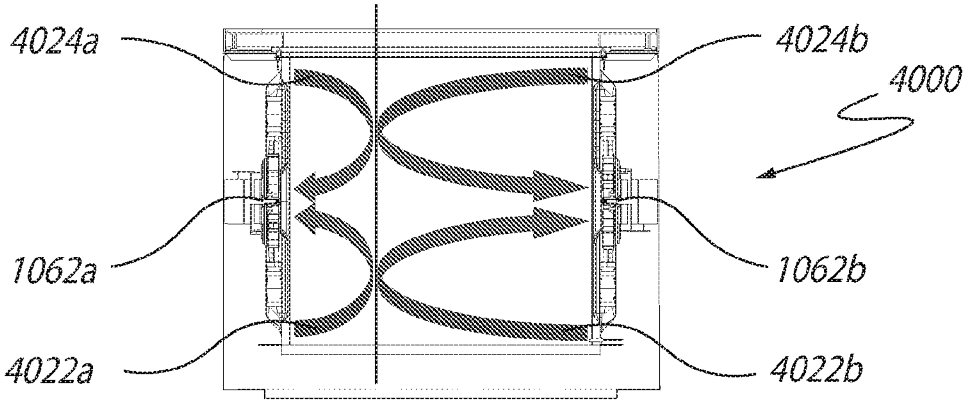

FIGS. 23A to 23B show airflows of a dual fan (impeller) oven 4000, which operates in generally the same manner as the ovens 1000, 2000 and 3000 described above, with like reference numerals being used to indicate like features. Two pairs of 'cells' of strong air circulation defined by the opposing paths 4022*a*, 4022*b*, 4024*a*, and 4024*b* are provided, similar to the cells 2022 and 2024 described above. By varying the fan speeds of each fan (impeller) 1062*a* and 1062*b*, a centre line between the two pair of air cells may be adjusted. For example, in FIG. 23A, each fan (impeller) 1062*a*, 1062*b* operates at a fan speed of 50%, such that the center line between the two pairs of air cells is also provided at the centre of the oven 4000. In FIG. 23B, left side fan (impeller) 1062*a* operates at a fan speed of 70%, whilst right side fan (impeller) 1062*b* operates at a fan speed of 30% such that the centre line is provided towards the right side of the oven 4000. In FIG. 23C, left side fan (impeller) 1062*a* operates at a fan speed of 30%, whilst right side fan (impeller) 1062*b* operates at a fan speed of 70% such that the centre line is provided towards the left side of the oven 4000. Typically, at the center line between two pairs of air cells, there is slow moving air. The above dual fan arrangement may at least allow the center line to be moved, so as to ensure that food is able to be cooked evenly by reducing or altogether eliminating the presence of cold spots.

Various forms of the ovens and associated componentry described above may have one or more of the following advantages. For example, the arrangement of the air guides or vanes may at least ensure that air flow within the oven cooking cavity may be evenly distributed, and little resistance is encountered when capturing and redirecting the air through the inlet manifold. The increased even air flow may also allow for more stable temperatures within the oven cooking cavity, and even cooking across the multiple rack positions simultaneously. Additionally, it will be appreciated that the increased or faster air flow may at least reduce the boundary layer of air around the food that is being cooked, resulting in faster heat transfer and faster cook times.

It will also be appreciated that the distance or spacing between the vertical heating elements and the motor may at least prevent overheating of the motor during operation of the oven. Accordingly, higher wattage heating elements may also be utilised to allow for faster cook times to be achieved without damaging the performance of the motor. Further, the structure and arrangement of the heating elements may also allow for the air guides or vanes to be positioned between the impeller and the heating elements, which may at least ensure that air flow from the impeller is captured directly by the air guides or vanes for less turbulent air flow.

The design of the BLDC motors discussed above may also avoid the need for expensive manufacturing processes such as post machining, or additional componentry such as rear mounted cooling impellers. The overall size of the motor assembly may also be kept to a minimum, thereby allowing the motor to operate safely in the typically hot and compact environment of the oven.

Additionally, the positioning of the control electronics in the door and the associated design of the air channel may at least utilise natural convection air currents to cool the control electronics in the oven door, which may at least allow for safe temperature regulation of the oven.

Although the invention has been described with reference to preferred embodiments, it will be appreciated by those persons skilled in the art that the invention may be embodied in many other forms.

The invention claimed is:

1. An oven having a body that includes a rear wall, a base, a ceiling, and side walls extending between the base and the ceiling, the side walls at least partly surrounding a cooking cavity, the oven including:

an impeller assembly mounted to the rear wall of the oven body, the impeller assembly including:

an impeller that is rotatable to direct air flow within the cooking cavity;

a plurality of air guides that at least partially surround the impeller, the air guides each defining a channel that extends generally transversely from a central axis of the impeller;

a pair of vertical heating elements located on either side of the impeller, whereby air that is directed from the impeller travels transversely along the channels of the air guides, across the vertical heating elements, and into the cooking cavity; and upper heating elements extending across the ceiling of the oven body and lower heating elements extending across the base of the oven body, wherein the channel of each air guide extends transversely towards either a right side wall or a left side wall of the oven body, whereby opposing channels create linearly opposing flow paths, and whereby air that travels along the opposing channels subsequently travels towards a front portion of the cavity, across the upper and lower heating elements, then towards the rear wall of the oven body and then again across the upper and lower heating elements and wherein the vertical heating elements include a series of air guide portions that are aligned with and correspond to the channels of the air guides that at least partially surround the impeller.

2. The oven according to claim 1, wherein the air guides each include an upper vane and a lower vane, the upper and lower vanes being connected by a backing portion to define the respective channel therebetween.

3. The oven according to claim 1, wherein the air guides are mounted to an inlet manifold of the impeller assembly.

4. The oven according to claim 1, wherein the air movement creates two air cells within the cooking cavity, the two air cells having opposing flow paths.

5. The oven according to claim 1, wherein the air guides are positioned between the impeller and the vertical heating elements such that the air guides capture air flow directly from the impeller, whereby the vertical heating elements are spaced from the central axis of the impeller, and thereby a motor of the impeller assembly, by a distance.

6. The oven according to claim 1, wherein the vertical heating elements each have a generally U-shaped structure defined by two spaced apart parallel and elongated portions connected at their upper ends by a curved portion.

7. The oven according to claim 6, wherein the vertical heating elements each include at least one mounting portion located towards an upper part of the U-shaped structure adjacent the curved portion.

8. The oven according to claim 1, wherein each of the vertical heating elements is configured to emit thermal electromagnetic radiation, and the rear wall of the oven is configured to reflect the emitted thermal electromagnetic radiation into the cavity to provide a visual indication of an operating state of the oven, to provide a visual indication of an operating state of the oven.

* * * * *